United States Patent
Yanagihara

(10) Patent No.: US 7,836,210 B2
(45) Date of Patent: Nov. 16, 2010

(54) INFORMATION DISTRIBUTION SYSTEM, TERMINAL APPARATUS USED IN SUCH SYSTEM, RECORDING MEDIUM ON WHICH PROGRAM IS RECORDED, AND LOOP CONNECTION AVOIDANCE METHOD

(75) Inventor: Yasushi Yanagihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 222 days.

(21) Appl. No.: 12/078,037

(22) Filed: Mar. 26, 2008

(65) Prior Publication Data

US 2008/0275999 A1    Nov. 6, 2008

(30) Foreign Application Priority Data

May 1, 2007    (JP)    ............................. 2007-121199

(51) Int. Cl.
  G06F 15/16    (2006.01)
  G06F 15/173   (2006.01)
  H04L 12/28    (2006.01)
  H04L 12/56    (2006.01)

(52) U.S. Cl. ........................ 709/252; 370/256; 370/407; 709/238

(58) Field of Classification Search ................. 709/238, 709/252; 370/256, 407
See application file for complete search history.

(56) References Cited

U.S. PATENT DOCUMENTS

| | | | | |
|---|---|---|---|---|
| 5,831,975 | A | * | 11/1998 | Chen et al. .................. 370/256 |
| 6,032,194 | A | * | 2/2000 | Gai et al. .................... 709/239 |
| 6,373,826 | B1 |   | 4/2002 | Russell et al. |
| 6,501,754 | B1 | * | 12/2002 | Ohba et al. ................. 370/389 |
| 6,665,305 | B1 | * | 12/2003 | Weismann .................. 370/401 |
| 6,717,922 | B2 | * | 4/2004 | Hsu et al. ................... 370/258 |
| 6,798,739 | B1 |   | 9/2004 | Lee |
| 6,857,027 | B1 | * | 2/2005 | Lindeborg et al. .......... 709/239 |
| 6,879,594 | B1 | * | 4/2005 | Lee et al. .................... 370/408 |

(Continued)

FOREIGN PATENT DOCUMENTS

JP    A 2000-49779    2/2000

(Continued)

*Primary Examiner*—George C Neurauter, Jr.
(74) *Attorney, Agent, or Firm*—Oliff & Berridge, PLC

(57) ABSTRACT

In order that a loop does not occur when switching upstream terminal apparatus, to provide an information distribution system capable of preemptively detecting a distribution route loop, and avoiding the loop, a terminal apparatus and a program used in the same system, as well as a loop connection avoidance method.

A terminal apparatus B which has received loop connection detection information from upstream determines whether or not a downstream terminal apparatus of a control path which is not a distribution route along which contents information is flowing, and a source of the loop connection detection information match and, in the event that they match, determines that a loop will occur. By this means, it is possible to determine in advance that a loop will occur, before switching an upstream connection destination. Also, substitute upstream terminal apparatus search information is transmitted in a downstream direction from terminal apparatus B0 and B1, which are second nodes, and a terminal apparatus B which has received the substitute upstream terminal apparatus search information, but has not received the loop connection detection information, is made a substitute upstream apparatus. By switching to the substitute upstream apparatus, it is possible to avoid the loop.

10 Claims, 15 Drawing Sheets

U.S. PATENT DOCUMENTS

| | | | |
|---|---|---|---|
| 6,952,690 B2 * | 10/2005 | Lumpp et al. | 706/47 |
| 6,954,437 B1 * | 10/2005 | Sylvest et al. | 370/256 |
| 7,076,594 B2 * | 7/2006 | Benedetto et al. | 710/316 |
| 7,379,426 B2 * | 5/2008 | Sekiguchi | 370/241 |
| 7,471,624 B2 * | 12/2008 | Fukui et al. | 370/222 |
| 7,539,154 B1 * | 5/2009 | MacKay et al. | 370/256 |
| 7,558,205 B1 * | 7/2009 | Moncada-Elias et al. | 370/236 |
| 2006/0013141 A1 | 1/2006 | Mutoh et al. | |

FOREIGN PATENT DOCUMENTS

JP     A 2006-59133     3/2006

* cited by examiner

⟶o⟶ 0 SYSTEM CONNECTION CONTROL PATH
⟶ 1 SYSTEM CONNECTION CONTROL PATH

→○→ 0 SYSTEM CONNECTION DISTRIBUTION ROUTE

——→ 1 SYSTEM CONNECTION DISTRIBUTION ROUTE

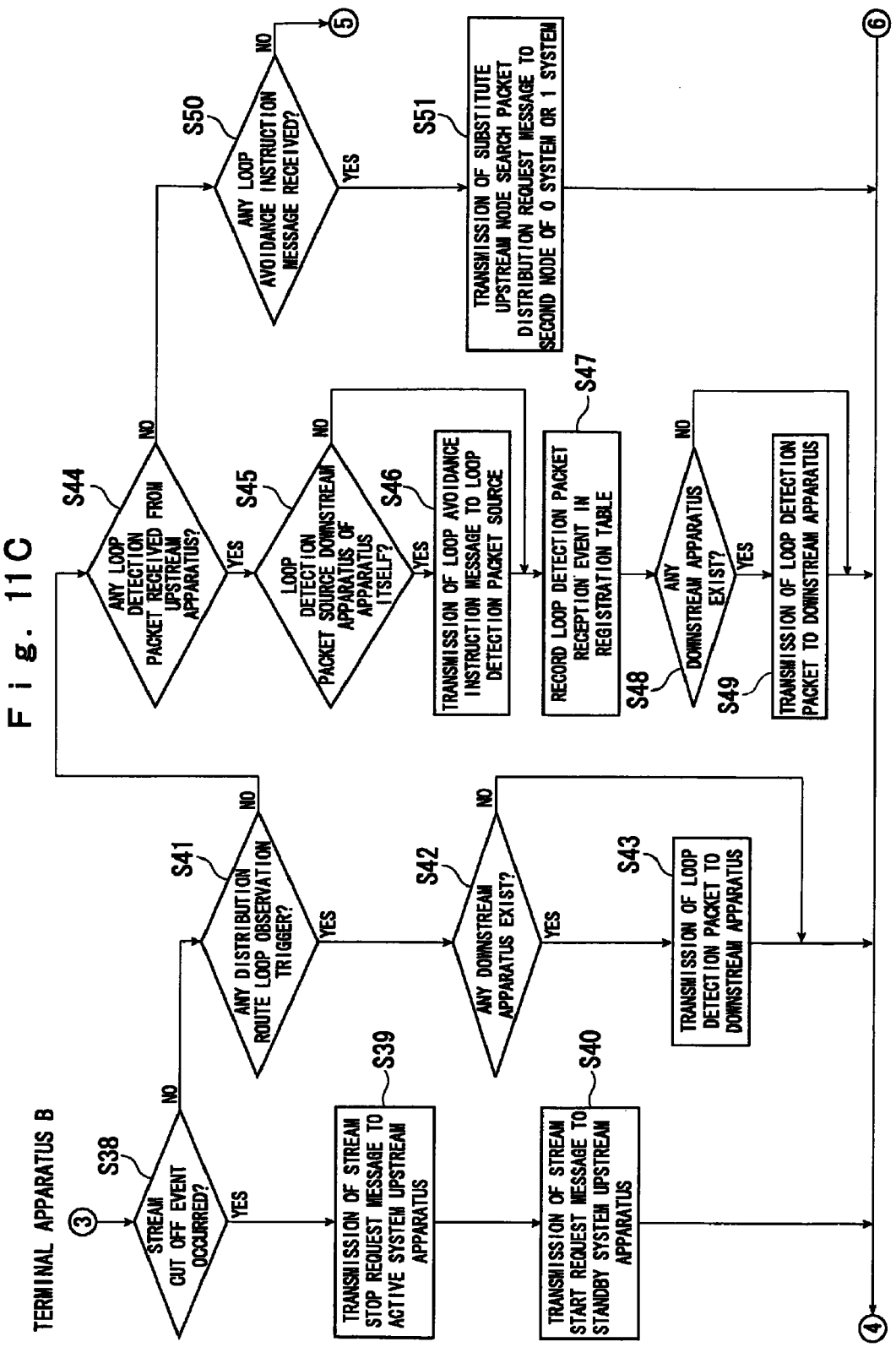

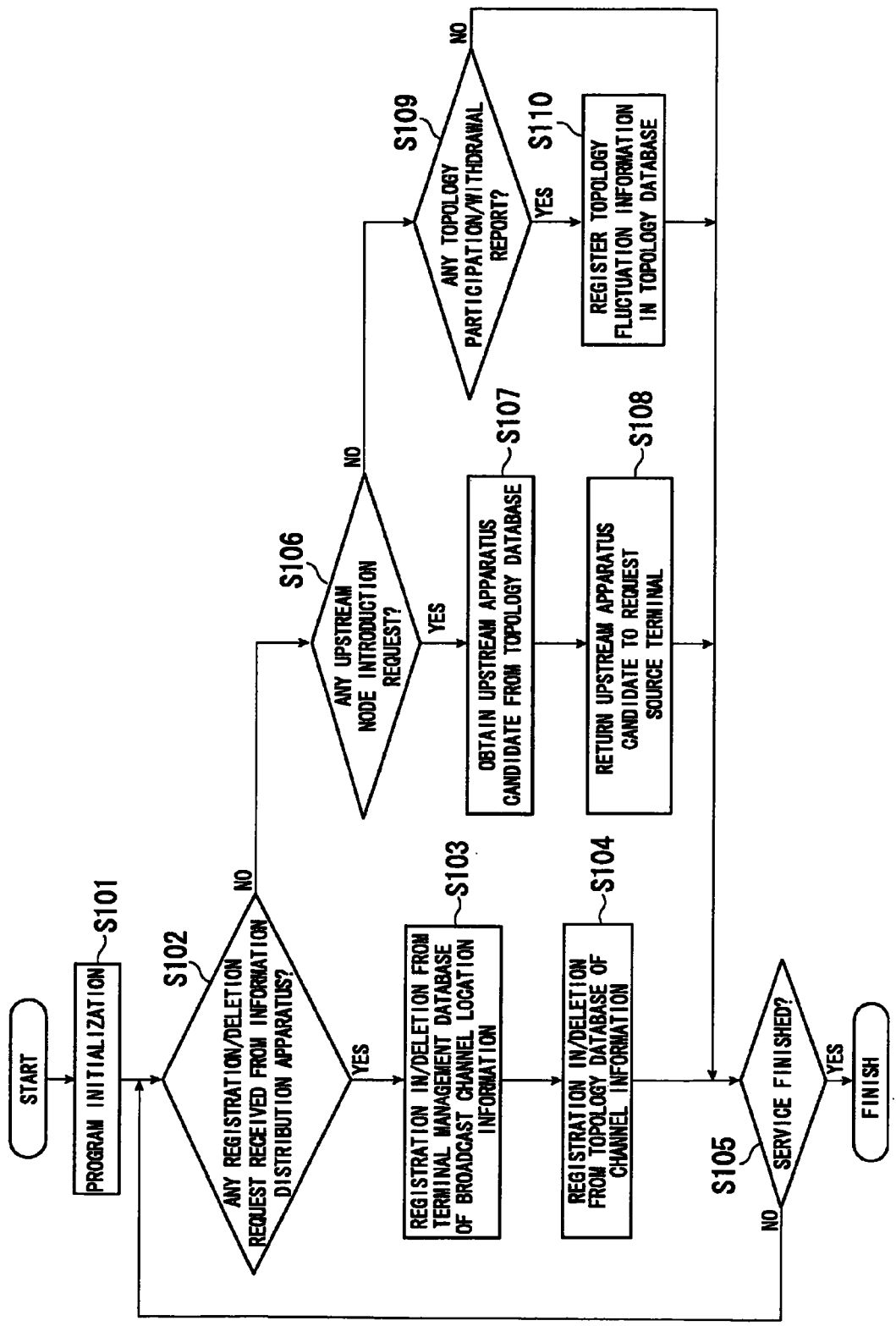

INFORMATION DISTRIBUTION SYSTEM, TERMINAL APPARATUS USED IN SUCH SYSTEM, RECORDING MEDIUM ON WHICH PROGRAM IS RECORDED, AND LOOP CONNECTION AVOIDANCE METHOD

CROSS-REFERENCE TO RELATED APPLICATION

This application is based on and claims the benefit of priority from Japanese Patent Application No. 2007-121199, filed on May 1, 2007; the entire contents of which are incorporated herein by reference.

BACKGROUND OF THE INVENTION

1. Field of the Invention

The present invention relates to an information distribution system, a terminal apparatus used in the same system and a recording medium on which a program is recorded, as well as a loop connection avoidance method, and particularly to an information distribution system which distributes contents information in a network in which a plurality of terminal apparatus are mutually connected by forming the duplicated tree topology, a terminal apparatus used in the same system and a recording medium on which a program is recorded, as well as a loop connection avoidance method.

2. Description of the Related Art

To date, there is a technology called an ALM (Application Layer Multicast), which carries out a relay distribution of information on a contents stream (hereafter referred to as contents information), while managing a contents distribution route in an application layer. This technology is one which distributes the contents information by carrying out a P2P (Peer to Peer) communication between nodes (hereafter referred to as terminal apparatus) such as personal computers or STB (Set Top Box) apparatus.

In this kind of ALM technology, depending on differences in a distribution topology management method and construction method, they are divided into the following kinds of method. That is, depending on the differences in the distribution topology management method, they are divided into a hybrid type P2P and a pure type P2P method, while depending on the differences in the distribution topology construction method, they are divided into a Mesh-First approach, a Tree-First approach and an Implicit approach method.

The hybrid type P2P is a method in which a designated server apparatus manages common topology information, while the pure type P2P is a method in which individual terminal apparatus manage partial topology information. Also, the Mesh-First approach is a method in which terminal apparatus construct a mesh-shaped topology, and select a distribution route for distributing a data stream therefrom by means of an RPF (Reverse Path Forwarding) or the like, the Tree-First approach is a method in which terminal apparatus construct a tree-shaped topology, from which each terminal apparatus searches for an adjacent terminal apparatus, and renders redundant a spare distribution route, and the Implicit approach is a method in which terminal apparatus construct a control data topology using a specific metric, and make that itself a distribution route (a method of an approach by which a tree and a mesh are made simultaneously).

The mesh type topology, not being limited to a technology field of the heretofore described ALM, is also employed in a technology field of an IP multicast or a LAN. In the mesh type topology, as it is constructed of a tight control communication network in which a certain terminal apparatus has a connection relationship with a plurality of terminal apparatus, a duplicated topology is constructed in order to guarantee continual operations, even in a case in which a connection between terminal apparatus is cut off and a stream cut off event occurs.

However, in the event that the connection between the terminal apparatus is cut off, reconstructing the distribution route randomly will result in a loop connection occurring in a distribution route. Therein, as a method of avoiding this kind of distribution route loop connection, there is, for example, the one described in Japanese Unexamined Patent Publication No. 2000-49779. Although the method in the patent publication does not target duplicated mesh type topology, in the technology field of the ALM, which has a mesh type topology, a distribution route between a root terminal apparatus and a targeted terminal apparatus (a root path) is sought by sending a packet which stores route information along the distribution route, and a loop connection is detected by confirming that the targeted terminal apparatus is not included in the root path. Then, in an upstream selection process when an upstream terminal apparatus is reconnected, by selecting an upstream terminal apparatus having a root path which does not include the own terminal apparatus itself, the loop connection is avoided.

The heretofore described method of Japanese Unexamined Patent Publication No. 2000-49779, in the event of finding an upstream substitute node in order to avoid a distribution route loop, uses a protocol which transmits a search message in an upstream direction from a targeted terminal apparatus. For this reason, in the event that a plurality of terminal apparatus attempt to widen a search range and execute a process, there has been a problem in that search messages concentrate in an upstream terminal apparatus, and a processing load increases.

SUMMARY OF THE INVENTION

Therein, it is desirable to, in a case of forming a contents distribution route based on a topology in which trees are duplicated, in order that a loop connection does not occur when switching upstream terminal apparatus, provide an information distribution system capable of preemptively detecting a distribution route loop connection, and avoiding the loop connection, a terminal apparatus used in the same system and a recording medium on which is stored a program, as well as a loop connection avoidance method.

According to one aspect of the invention, there is provided a terminal apparatus in an information distribution system which includes: an information distribution apparatus which distributes contents information via a network; and a plurality of the terminal apparatus which, being connected to the network, receive the contents information distributed from the information distribution apparatus, and in which a plurality of hierarchical structures, formed by the plurality of terminal apparatus being logically connected in multiple layers with the information distribution apparatus as an apex, are provided on the network, and each terminal apparatus, in a condition in which it participates in at least two of the hierarchical structures, receives the contents information from an upstream terminal apparatus connected to itself in one hierarchical structure. The terminal apparatus includes: a controller which, when its own apparatus switches the upstream terminal apparatus (connected to its own apparatus in the one hierarchical structure and provides the contents information) to another upstream terminal apparatus (connected to its own apparatus in another hierarchical structure), avoids a loop connection occurring in a distribution route of the contents information. The controller includes: a loop detection information transmitter which transmits loop connection detection information, including identification information for identifying its own apparatus, to a downstream terminal apparatus, connected to its own apparatus; a loop detection information receiver which receives the loop connection detection information; a loop detection information relay which relays the received loop connection detection information to the downstream terminal apparatus, connected to its own apparatus; a downstream terminal determiner which determines whether or not a terminal apparatus corresponding to the received loop connection detection information is a downstream terminal apparatus connected to its own apparatus in the plurality of hierarchical structures; a loop avoidance instruction transmitter which, in the event that it is determined, by the downstream terminal determiner, that it is a downstream terminal apparatus connected to its own apparatus, transmits loop connection avoidance instruction information, which instructs an avoidance of a loop connection, to the terminal apparatus corresponding to the loop connection detection information; and a loop avoidance instruction receiver which receives the loop connection avoidance instruction information. In this case, the controller, by changing the upstream terminal apparatus from the terminal apparatus which has transmitted the loop connection avoidance instruction information to another terminal apparatus, avoids a loop connection occurring in a distribution route of the contents information.

According to the invention, it is possible to detect an occurrence of a loop connection in a distribution route, based on the loop connection detection information. Consequently, as a terminal apparatus which is attempting to switch an upstream connection destination in a hierarchical structure switches, in place of a terminal apparatus where a loop connection will occur, to another terminal apparatus where no loop connection occurs, it is possible to preemptively avoid the loop connection occurring in the distribution route. Also, as the terminal apparatus, in order to detect an occurrence of a loop connection, transmits loop connection detection information toward downstream terminal apparatus, it not happening that the loop connection detection information concentrates in a specific terminal apparatus, it is possible to reduce the processing load.

BRIEF DESCRIPTION OF THE DRAWINGS

FIG. 11C is a diagram showing a process flow (3/4) of the terminal apparatus according to the embodiment;

FIG. 12 is a diagram showing a process flow of the connection candidate introduction apparatus.

DESCRIPTION OF THE PREFERRED EMBODIMENT

Figure 1:
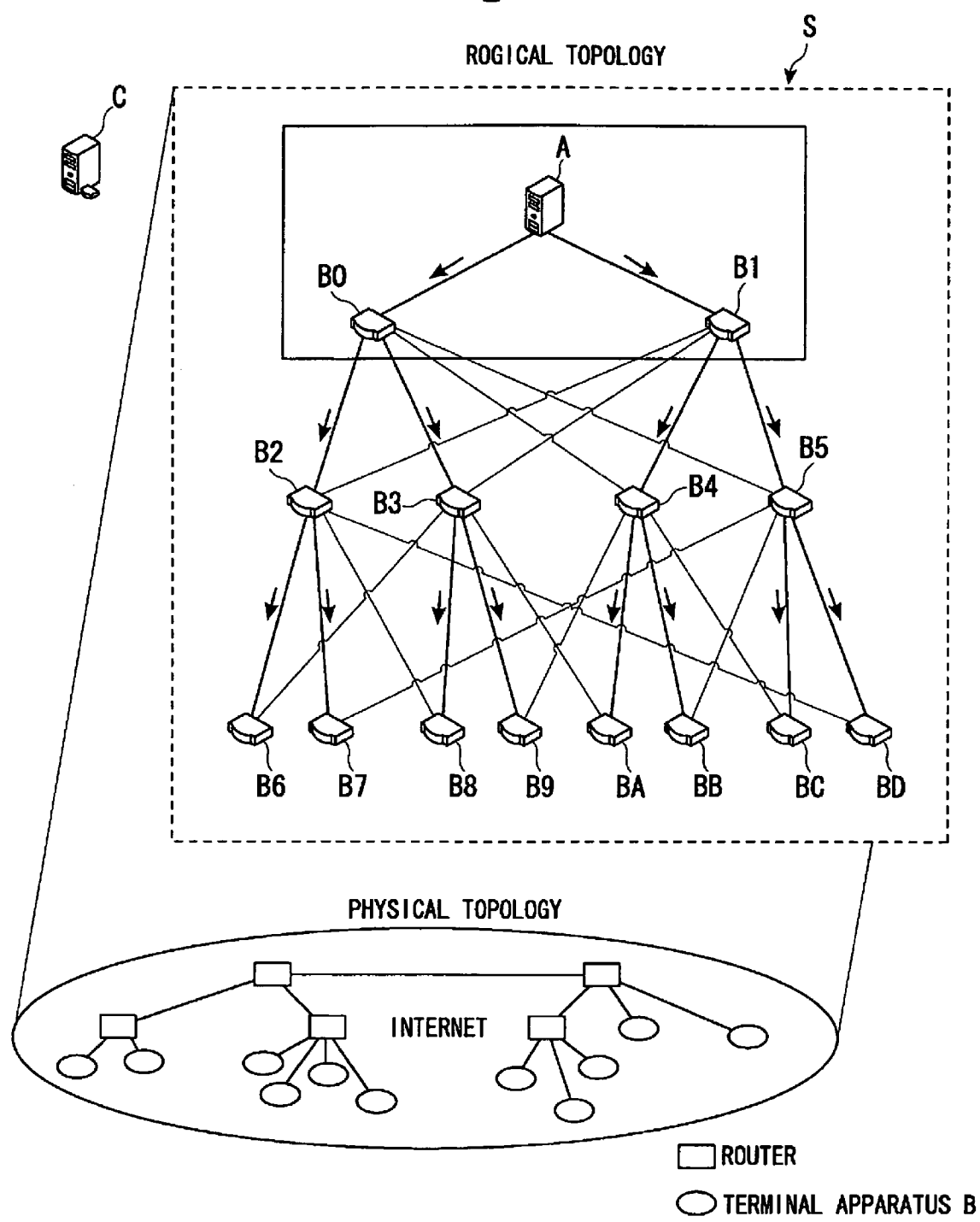
FIG. 1 is a diagram showing a basic configuration of an information distribution system in an embodiment.
Figure 2:
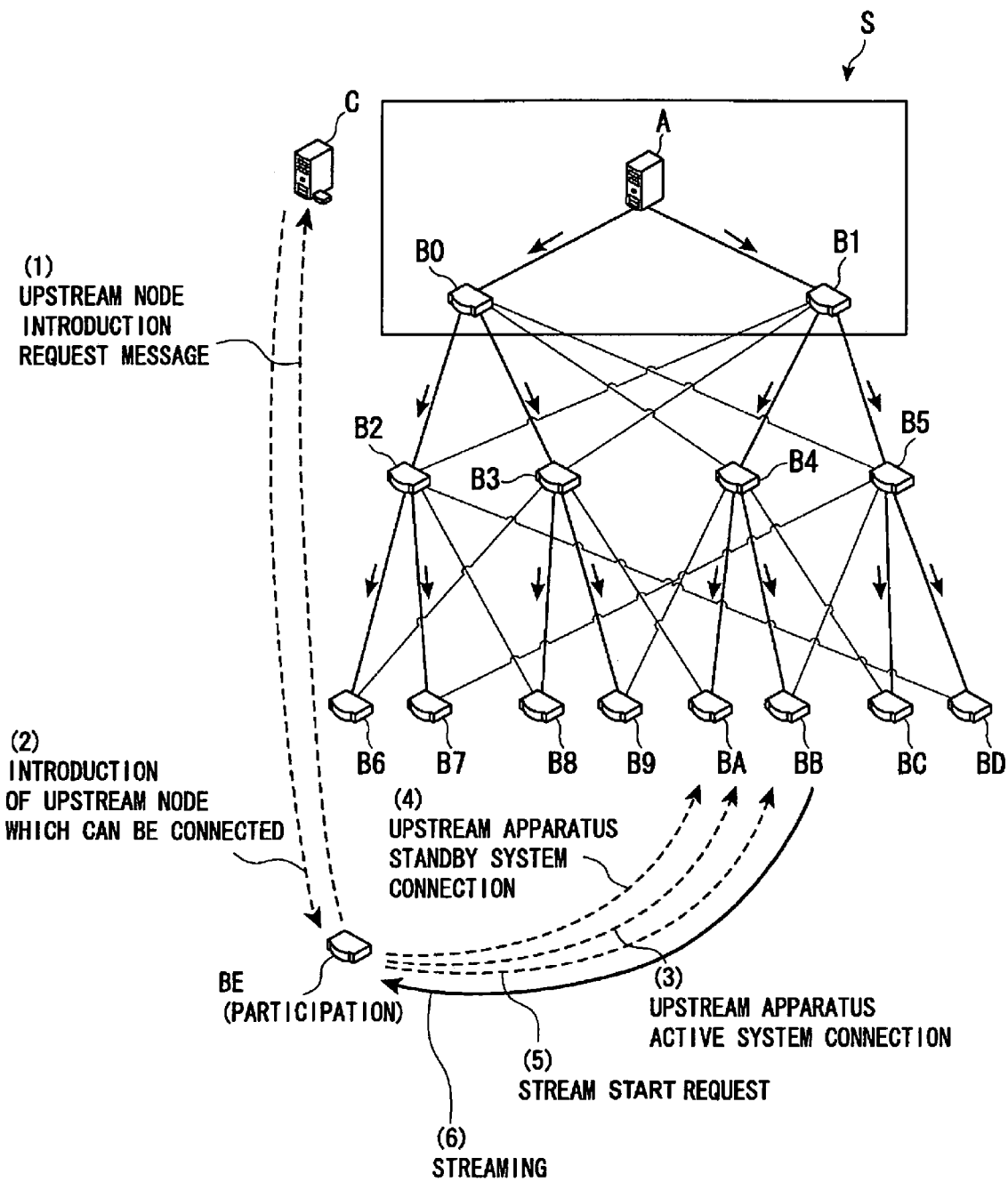
FIG. 2 is a diagram showing a terminal apparatus participation procedure.
Figure 3:
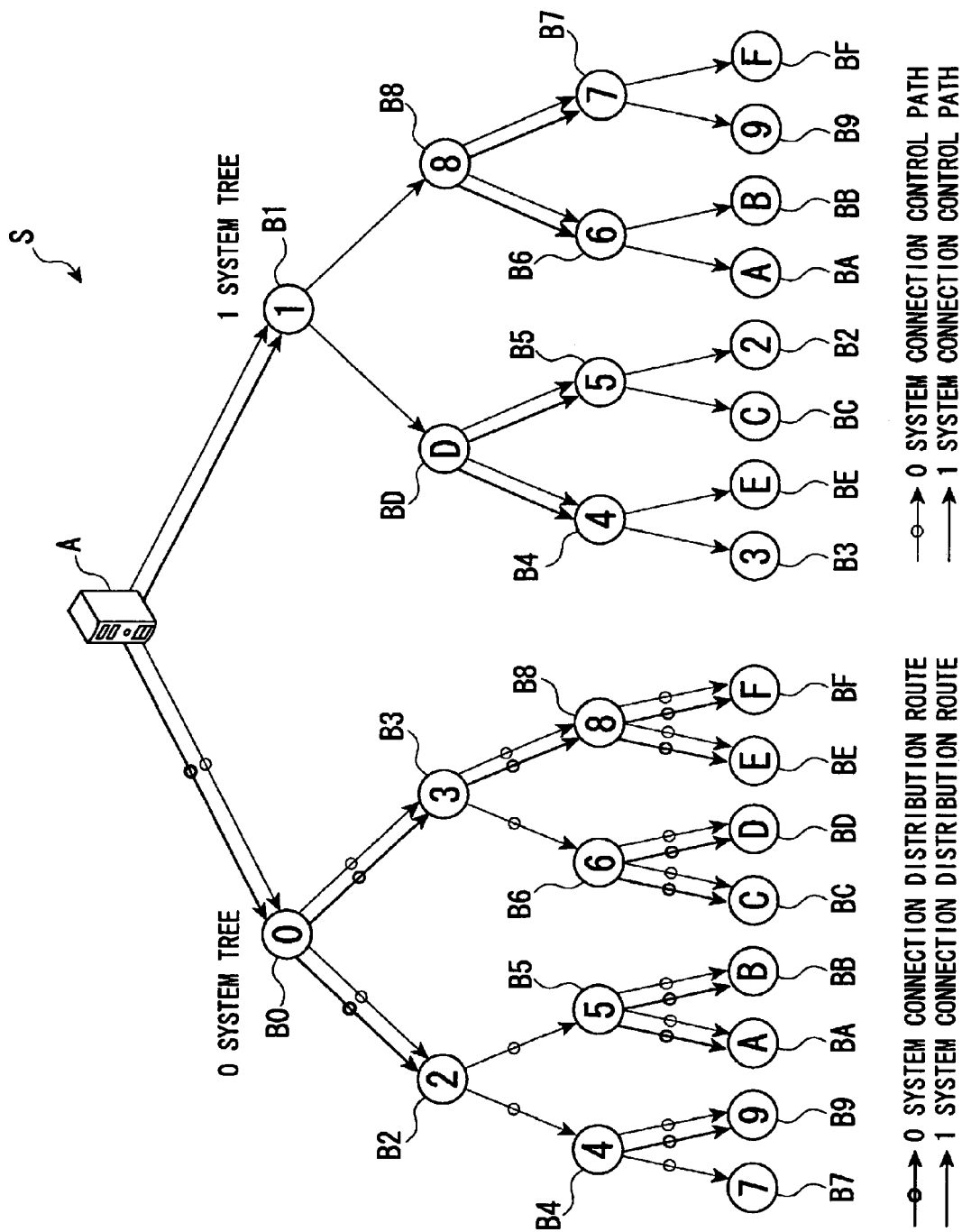
FIG. 3 is a diagram showing an example of distribution routes and control paths in a mesh type topology.
Figure 4:
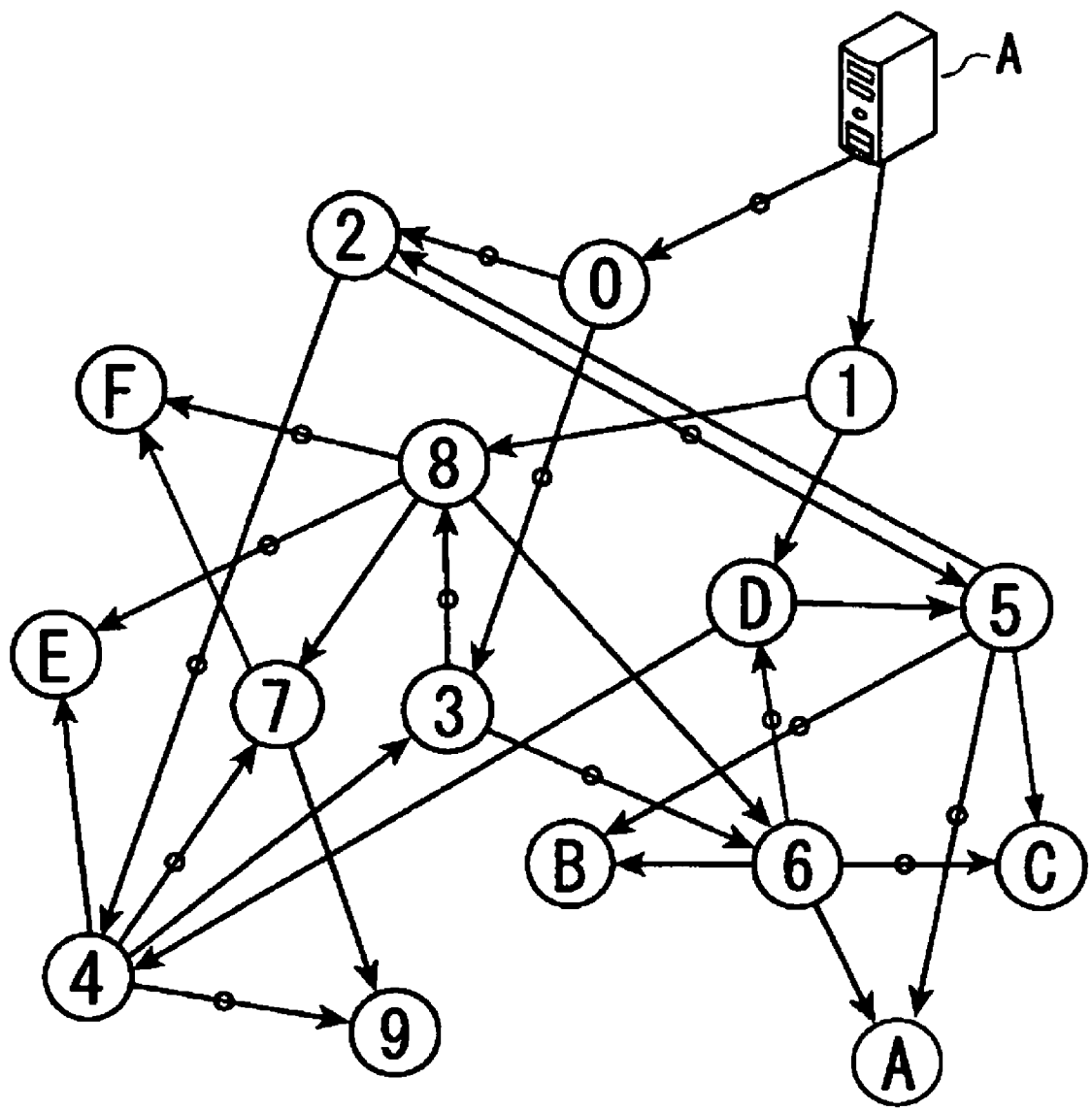
FIG. 4 is a diagram showing the control paths in FIG. 3.
Figure 5:
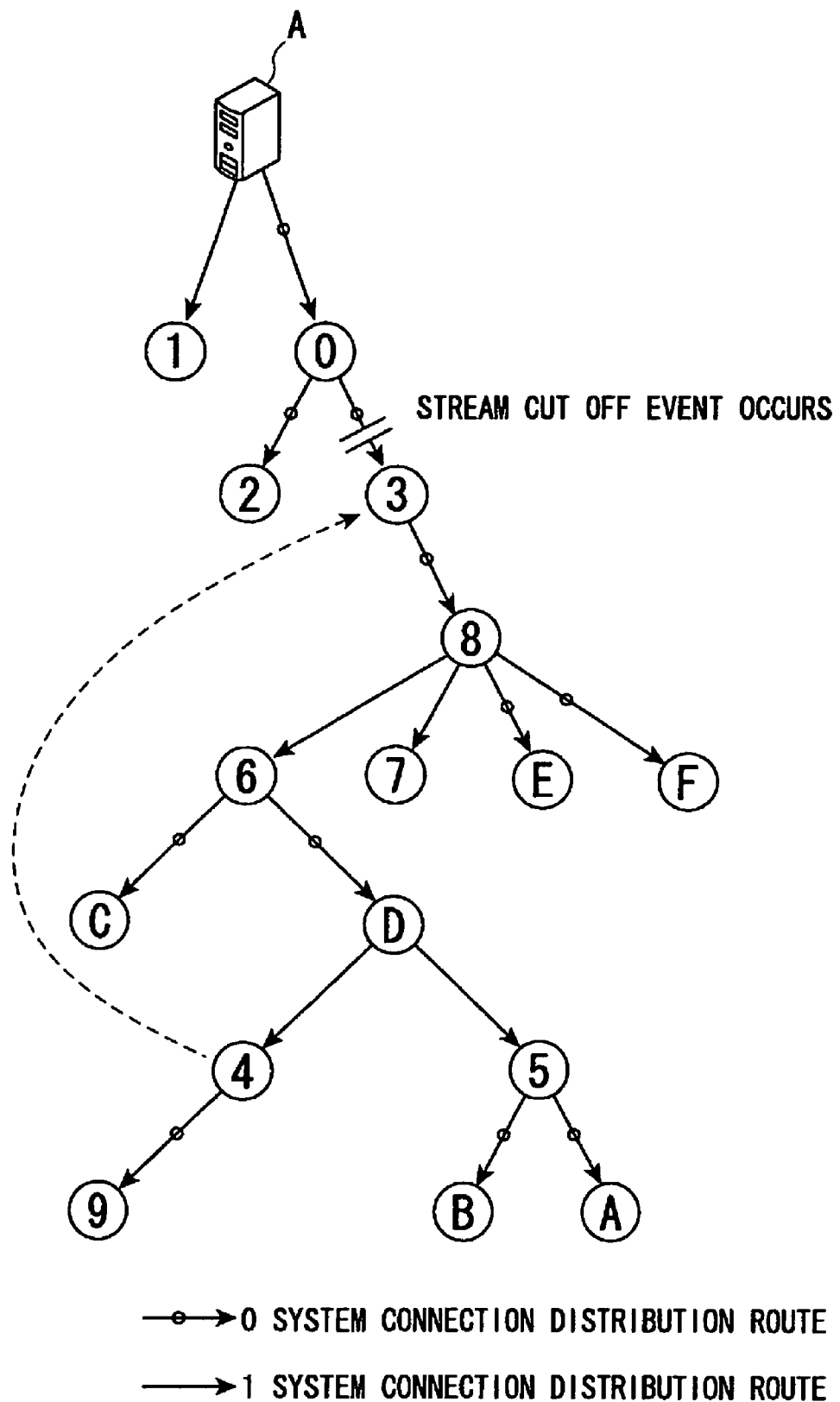
FIG. 5 is a diagram showing one portion of the distribution routes in FIG. 3.
Figure 6:
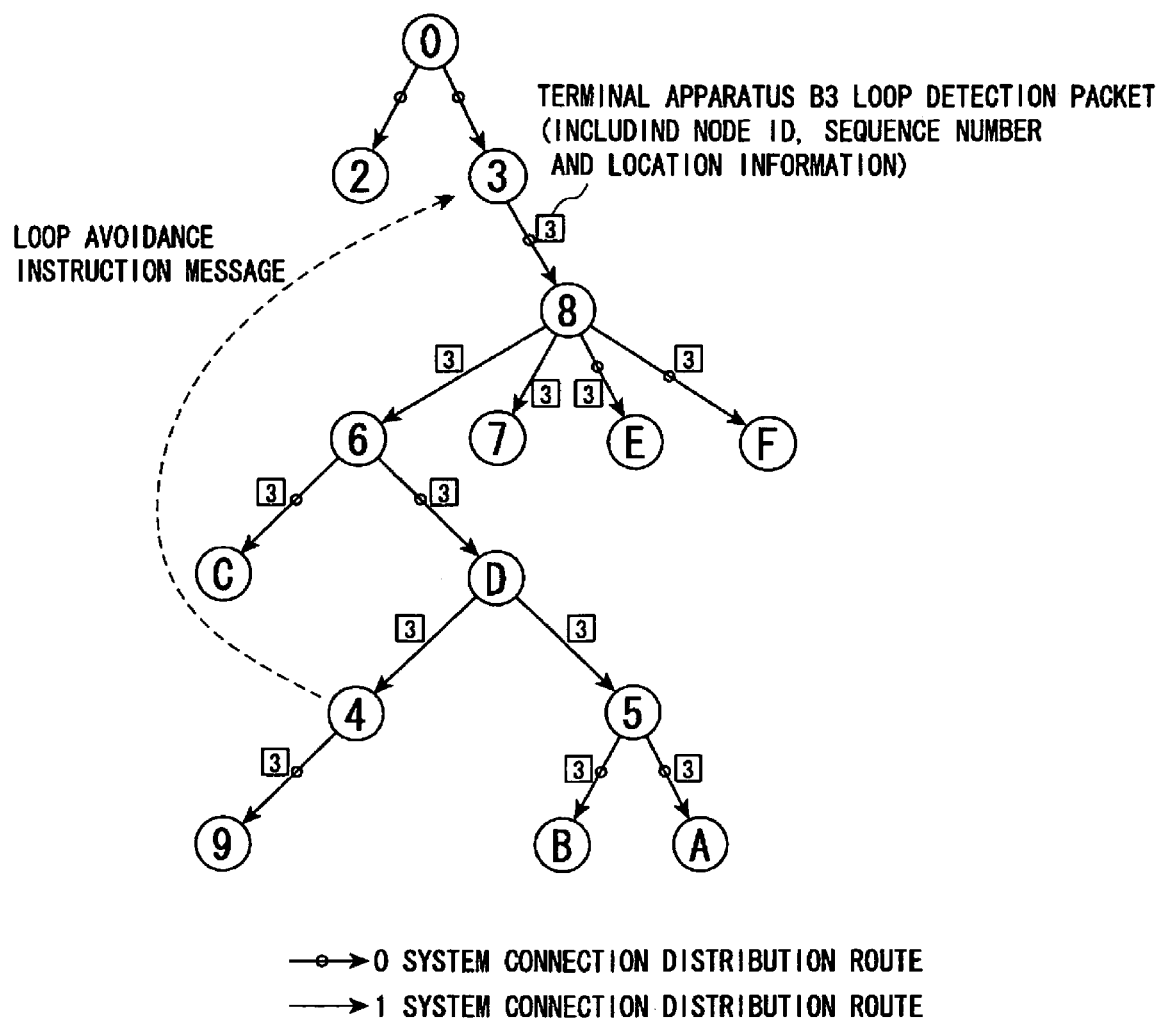
FIG. 6 is a diagram showing a method of detecting a loop of a distribution route.
Figure 7:
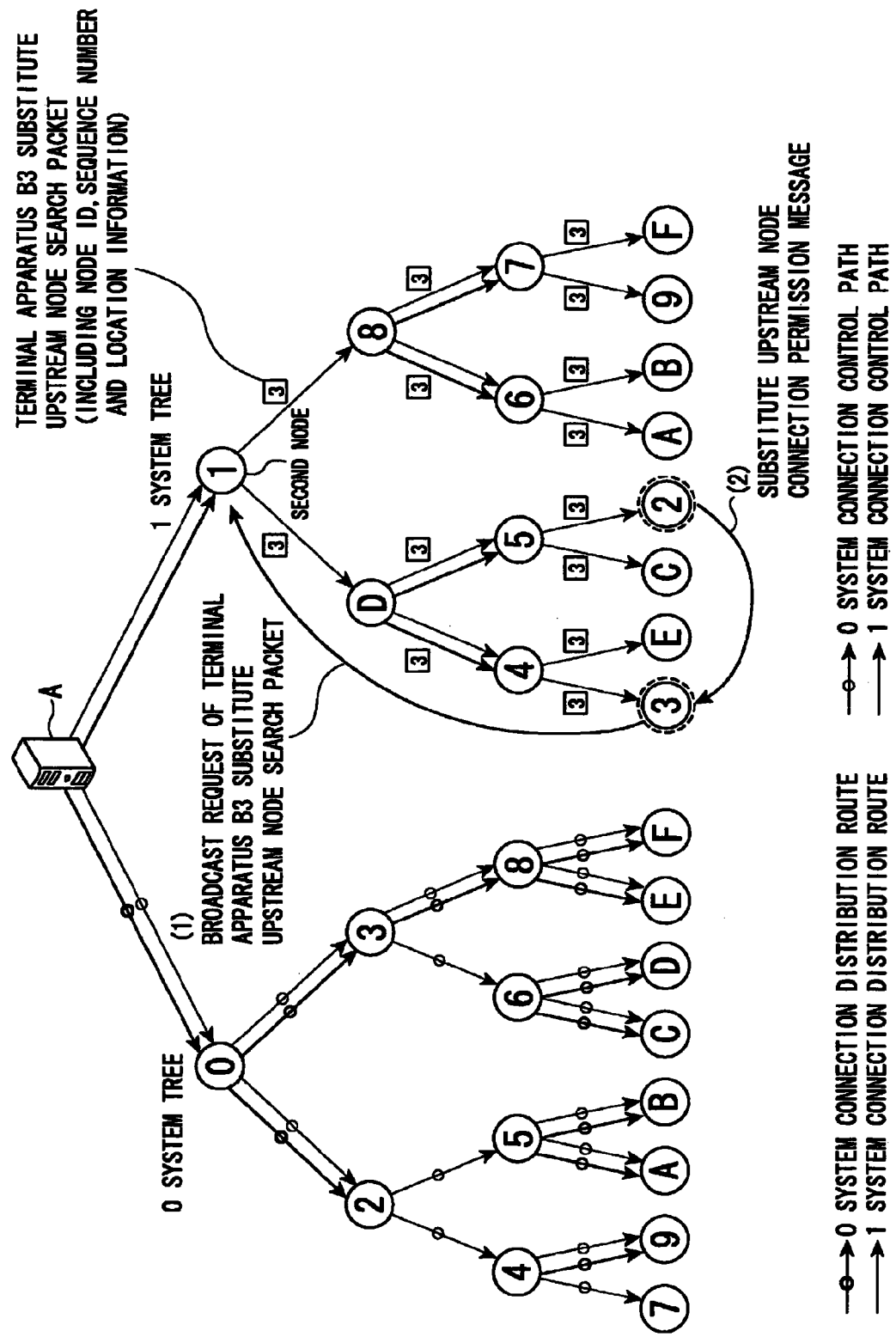
FIG. 7 is a diagram showing a method of searching for a substitute upstream node.
Figure 8:
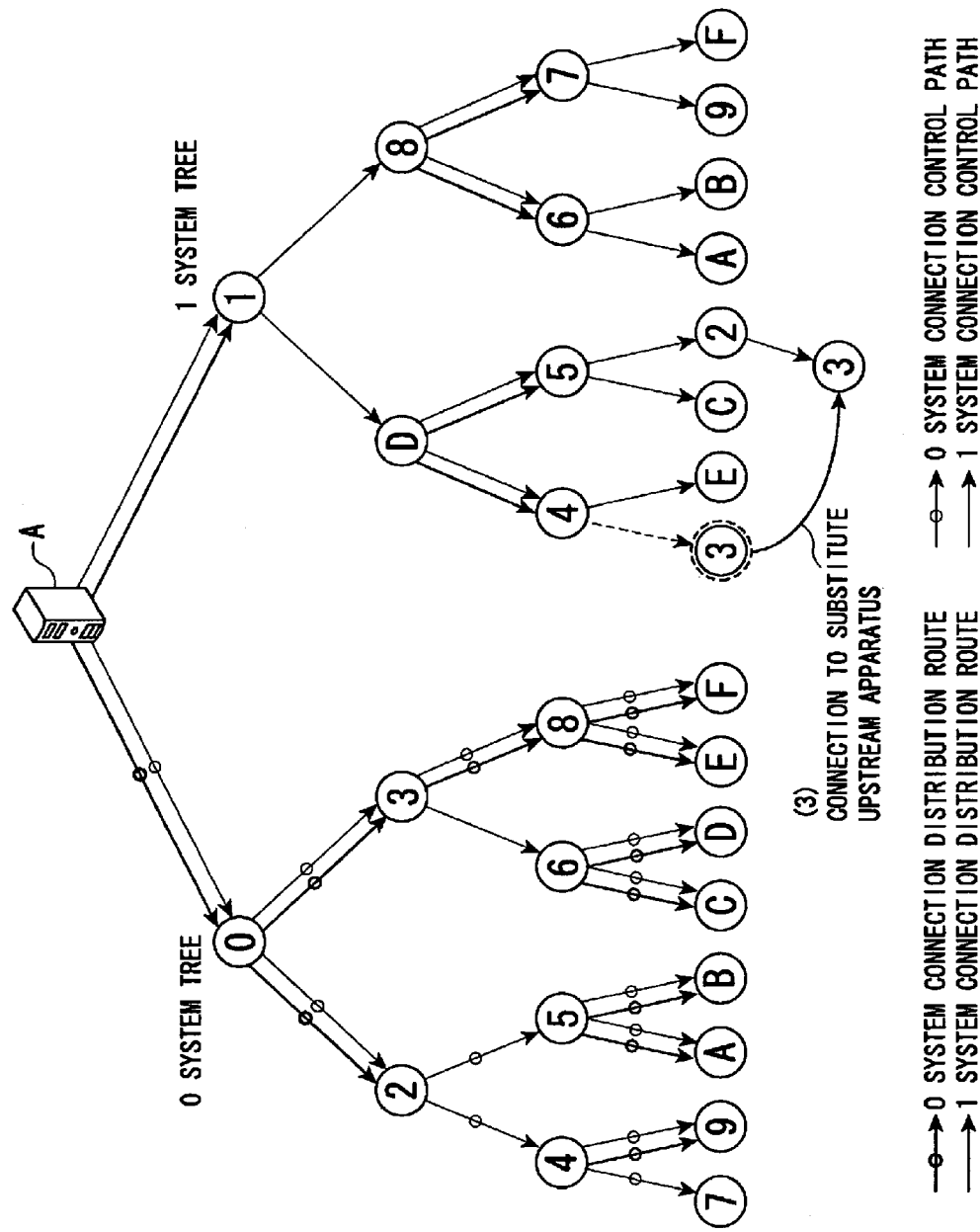
FIG. 8 is a diagram showing a reconnection process after searching for the substitute upstream node.
Figure 9:
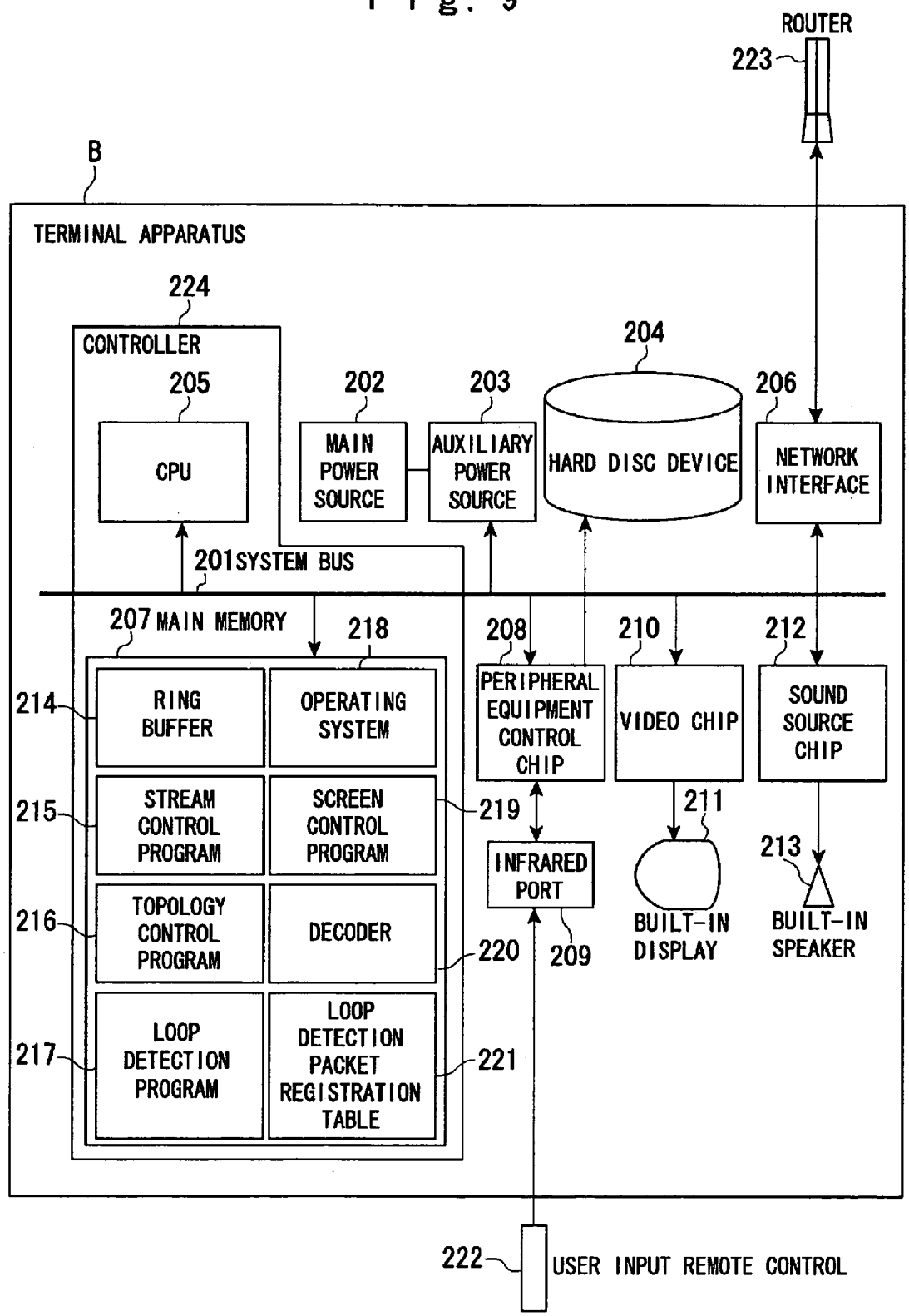
FIG. 9 is a diagram showing a configuration of the terminal apparatus according to the embodiment.
Figure 10:
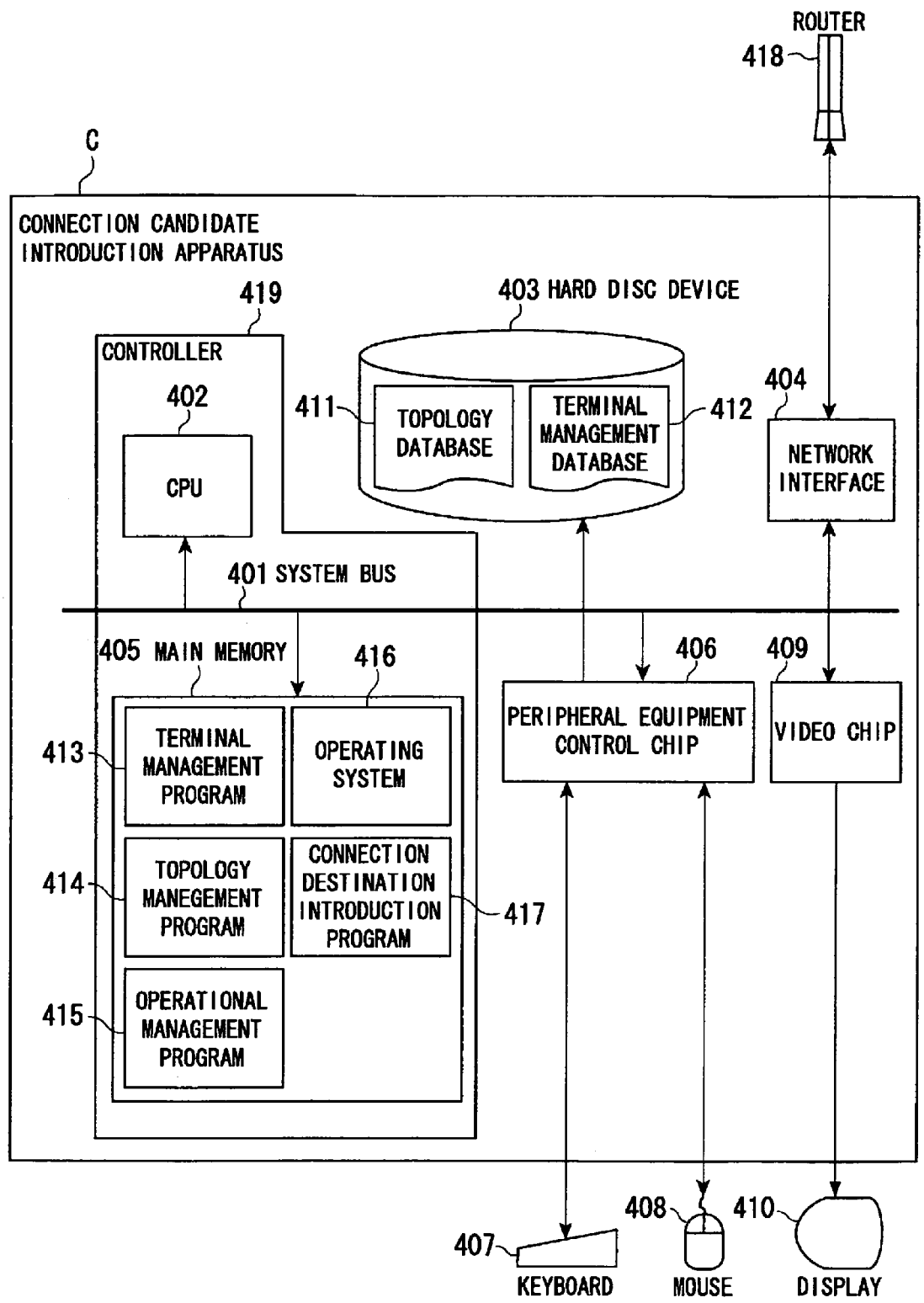
FIG. 10 is a diagram showing a configuration of a connection candidate introduction apparatus.
Figure 11A:
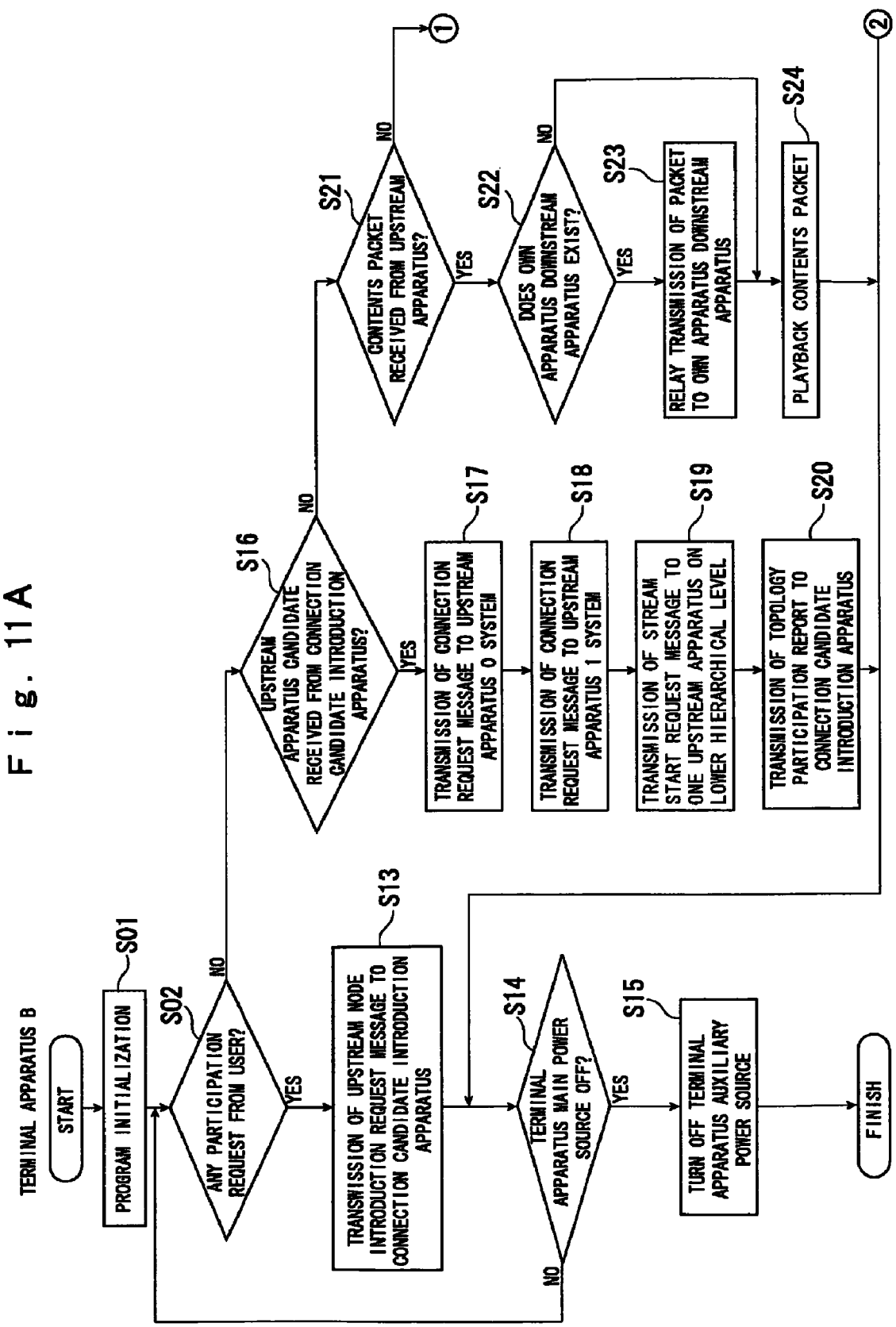
FIG. 11A is a diagram showing a process flow (1/4) of the terminal apparatus according to the embodiment.
Figure 11B:
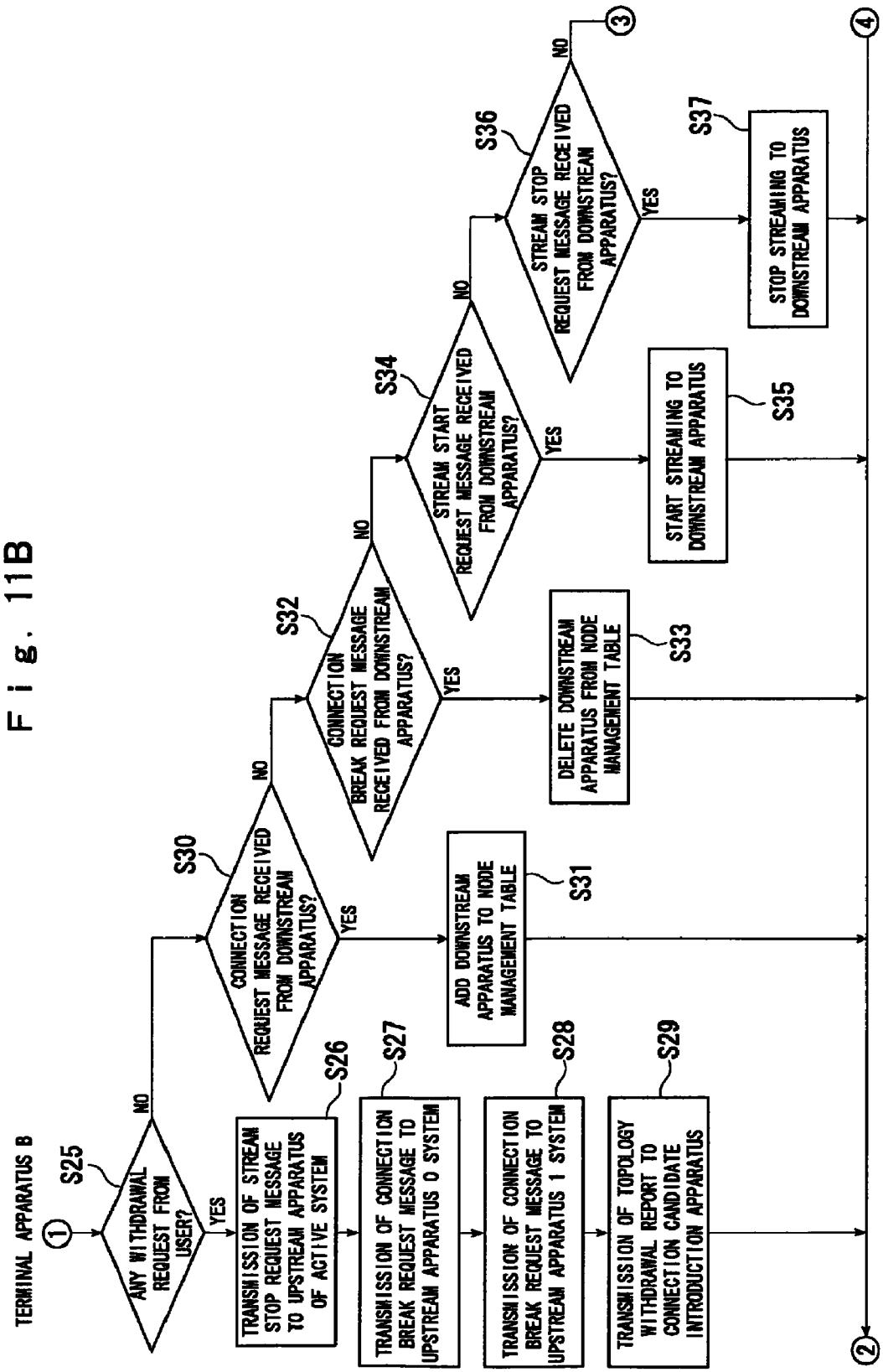
FIG. 11B is a diagram showing a process flow (2/4) of the terminal apparatus according to the embodiment.
Figure 11D:
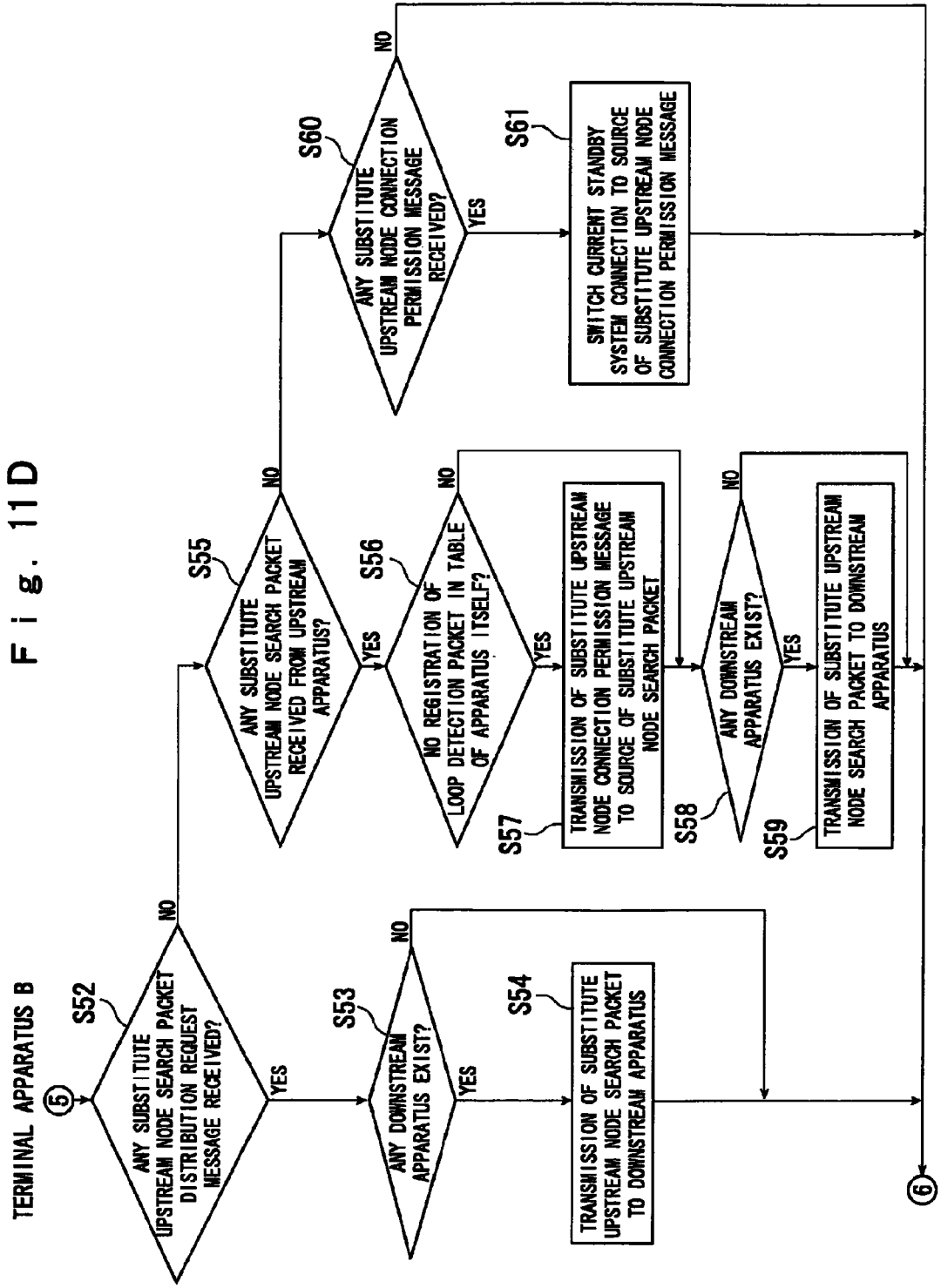
FIG. 11D is a diagram showing a process flow (4/4) of the terminal apparatus according to the embodiment.

Hereafter, a specific description will be given, referring to the drawings, of an embodiment of the invention. FIG. 1 is a diagram showing a basic configuration of an information distribution system in the embodiment of the invention. FIG. 2 is a diagram showing a procedure in a case in which a terminal apparatus newly participates in the information distribution system, in the information distribution system shown in FIG. 1. FIG. 3 is a diagram showing an example of distribution routes and control paths in a mesh type topology formed by duplicating a tree. FIG. 4 is a diagram showing the control paths in the mesh type topology shown in FIG. 3, while FIG. 5 is a diagram showing the distribution routes. FIG. 6 is a diagram showing a method of detecting a circular connection (hereafter called a loop) of a distribution route, which occurs in a case of switching an upstream connection destination. FIG. 7 is a diagram showing a method of searching for a substitute upstream terminal apparatus in which no loop occurs, in place of a terminal apparatus in which a loop occurs, in order to avoid the loop of the distribution routes. FIG. 8 is a diagram showing a reconnection process after finding the substitute upstream terminal apparatus. FIG. 9 is a diagram showing a configuration of the terminal apparatus, while FIG. 10 is a diagram showing a configuration of a connection candidate introduction apparatus. FIGS. 11A to 11D are diagrams showing a process flow in the terminal apparatus, while FIG. 12 is a diagram showing a process flow in the connection candidate introduction apparatus.

Outline of Information Distribution System

Firstly, with regard to an outline of the information distribution system in the embodiment of the invention, a description of the basic configuration and processes thereof will be given. FIG. 1 is a diagram showing the basic configuration of the information distribution system. This information distribution system S is configured including an information distribution apparatus A, a plurality of terminal apparatus B, and a connection candidate introduction apparatus C. The information distribution apparatus A distributes contents information to the terminal apparatus B. The terminal apparatus B, being apparatus on which a user can view the contents information, are provided dispersed on an internet, which forms the mesh type topology, and have a node management table in which is stored connection information relating to upstream terminal apparatus B and downstream terminal apparatus B. The connection candidate introduction apparatus C has a topology database, in which is stored topology management information of the terminal apparatus B, as well as a terminal management database, in which is stored location information (IP addresses and port numbers) and the like of the information distribution apparatus A and the terminal apparatus B and, as well as managing a connection condition thereof, introduces a terminal apparatus B nearest to an upstream side (an upstream apparatus) which can relay the contents information in a case in which a terminal apparatus newly participates in the mesh type topology.

The information distribution apparatus A and terminal apparatus B0 and B1 being installed OK, for example, in a broadcasting station facility, the terminal apparatus B0 is a second node positioned in a 0 system tree route, while the terminal apparatus B1 is a second node positioned in a 1 system tree route. Two upstream apparatus being connected to each of terminal apparatus B2 to BD, the mesh type topology is formed by duplicating two trees to which the terminal apparatus B are connected. Providing two upstream apparatus which are reception sources of the contents information and forming a duplication in this way is done in order to reduce an effect of the distribution of the contents information being cut off in a case in which a terminal apparatus B withdraws.

Also, the plurality of terminal apparatus B forming the mesh type topology under a control of the connection candidate introduction apparatus C, the contents information distributed from the information distribution apparatus A is relayed to all of the terminal apparatus B by forming a distribution route for the contents information in the topology. Also, each terminal apparatus B manages information on a nearest terminal apparatus B connected upstream (upstream apparatus connection information), and information on a nearest terminal apparatus B connected downstream (downstream apparatus connection information), by means of its node management table. When expressing the mesh type topology formed by the plurality of terminal apparatus B as a physical topology, it becomes a configuration in which the terminal apparatus B are connected, via routers, on the internet, as shown in FIG. 1.

Participation in Topology

Next, referring to FIG. 2, a description will be given of a procedure by which a terminal apparatus BE newly participates in the mesh type topology. On the terminal apparatus BE transmitting, as a trigger for the new participation of the terminal apparatus BE, an "upstream node introduction request message" to the connection candidate introduction apparatus C (1 in FIG. 2), the connection candidate introduction apparatus C retrieves the topology management information stored in the topology database, searches for apparatus, among the terminal apparatus B of the information, which can connect the terminal apparatus BE to its downstream side, and returns a "search result" (upstream apparatus candidates/ for example, terminal apparatus BA and BB) to the terminal apparatus BE (2 in the same figure). Herein, as the terminal apparatus BE newly participates in the duplicated mesh type topology, it is necessary to provide two control paths to differing upstream apparatus. Consequently, the connection candidate introduction apparatus C transmits two upstream apparatus candidates to the terminal apparatus BE as the "search result". In this case, it is desirable that the connection candidate introduction apparatus C, as far as possible, searches for two upstream apparatus candidates positioned on the same hierarchical level, for the purpose of reducing a probability of a loop occurring when the terminal apparatus BE switches the upstream connection destination. Herein, the hierarchical level refers to a hierarchical position in a tree structure, with the information distribution apparatus A as a base, in a direction of terminal apparatus B on a downstream side. For example, as the terminal apparatus BA and BB are positioned on a fourth level counting from the information distribution apparatus A, they exist on the same hierarchical level.

Then, the terminal apparatus BE tries to connect by transmitting a "connection request message" to each of the terminal apparatus BA and BB, which are the two upstream apparatus candidates acquired from the connection candidate introduction apparatus C (3 and 4 in the same figure). The terminal apparatus BA and BB, on receiving the "connection request message", add information on the terminal apparatus BE to the node management table which they manage internally, and return a "connection response message" to the terminal apparatus BE.

The terminal apparatus BE, on receiving the "connection response message", selects one of the terminal apparatus BA and BB, and transmits a "stream start request message" for connecting as a distribution route, to that apparatus (5 in the same figure). The terminal apparatus BE does not transmit a "stream start request message" to the other apparatus. On one of the terminal apparatus BA and BB receiving the "stream start request message", it prepares a stream relay object, and starts a streaming to the terminal apparatus BE (6 in the same figure). Herein, the stream relay object is an object which carries out a process receiving contents information from an upstream apparatus, and relaying it to a downstream apparatus. In this way, the terminal apparatus BE can participate in the mesh type topology with the terminal apparatus BA or BB as the upstream apparatus.

Withdrawal from Topology

Next, a description will be given of a procedure by which the terminal apparatus BE withdraws from the mesh type topology. The terminal apparatus BE, which is to withdraw, transmits a "stream stop request message" to one of the upstream terminal apparatus BA or BB, which is a stream information supply source, after which, it transmits a "connection severance request message" to both the terminal apparatus BA and BB.

The terminal apparatus BA or BB, on receiving the "stream stop request message", invalidates the stream relay object, and stops the streaming to the terminal apparatus BE. Then, on receiving the "connection severance request message", it deletes the information on the terminal apparatus BE from the node management table, and breaks off a connection relationship with the terminal apparatus BE. In this way, the terminal apparatus BE can withdraw from the mesh type topology.

Herein, in the terminal apparatus BE which is to withdraw from the mesh type topology, in the event that a terminal apparatus exists downstream thereof, a restoration of the distribution route is carried out according to one of methods a and b below.

a. Reproduction According to Timeout Method

The downstream terminal apparatus constantly monitors a condition of a streaming from the upstream terminal apparatus BE and, with a stream supply being cut off for a certain time as a trigger, invalidates a connection condition with the terminal apparatus BE, which is the upstream apparatus, and connects to a new upstream apparatus.

b. Reproduction According to Event Report Method

The terminal apparatus BE, when withdrawing from the mesh type topology, reports a withdrawal event toward the downstream terminal apparatus. The downstream terminal apparatus, on receiving the report of the withdrawal event from upstream, invalidates the connection condition with the terminal apparatus BE, which is the upstream apparatus, and connects to a new upstream apparatus.

Embodiment

Next, a detailed description will be given of the embodiment of the invention. FIG. 3 is a diagram showing, for the mesh type topology formed by duplicating the tree, an example of distribution routes and control paths thereof. As shown in FIG. 3, the information distribution system S constructs the 0 system tree and the 1 system tree, headed by the information distribution apparatus A, and forms the mesh type topology by each terminal apparatus B2 to BF participating dually in both trees. That is, the information distribution system S is one which provides a plurality of hierarchical structures formed by a plurality of terminal apparatus B being logically connected in multiple layers, with the information distribution apparatus A as an apex, and each terminal apparatus B, in a condition in which it participates in at least two hierarchical structures, receives contents information from an upstream apparatus connected to itself in one hierarchical structure. The information distribution apparatus A being a contents source, a terminal apparatus B0, which is a route of the 0 system tree, and a terminal apparatus B1, which is a route of the 1 system tree, exist as second nodes downstream thereof. Also, for example, in the terminal apparatus B2, two control paths for the terminal apparatus B0 and B5 existing on an upstream side thereof, an active system distribution route, which is a 0 system connection, is formed with the terminal apparatus B0, and a control path which could become a standby system distribution route, which is a 1 system connection, is formed with the terminal apparatus B5.

FIG. 4 is a diagram showing the control paths in FIG. 3. In FIG. 3, a broad arrow with a circle and a thin arrow with a circle indicate a 0 system distribution route and a 0 system control path respectively, while a broad arrow with no circle and a thin arrow with no circle indicate a 1 system communication route and a 1 system control path respectively. Also, the distribution routes indicate routes of a contents information flow, while the control paths indicate distribution routes of a control message used in a distribution of contents information, in order to maintain a connection relationship of the mesh type topology. Also, a number (0 to F) of each terminal apparatus B indicates a node number of the terminal apparatus B.

FIG. 5 is a diagram showing one portion of the distribution routes in FIG. 3. Now, as shown in FIG. 5, it is taken that contents information from the information distribution apparatus A is being supplied to each terminal apparatus B via the 0 system connection distribution route and the 1 system connection distribution route. Herein, in the event that, a stream interruption event occurring in the supply of the contents information from the terminal apparatus B0 to the terminal apparatus B3, the terminal apparatus B3 switches from the terminal apparatus B0 of the active system, established on the upstream side, to the terminal apparatus B4 of the standby system, also established on the upstream side, a distribution route loop occurs. Therein, in the embodiment of the invention, the occurrence of the distribution route loop is detected in advance, and the loop is avoided. Hereafter, a detailed description will be given of these procedures.

Loop Detection Procedure for Standby System Upstream Apparatus

Firstly, a description will be given of a procedure for detecting a distribution route loop for a standby system upstream apparatus. The loop detection is carried out in advance, before carrying out a switch from the active system to the standby system. Each terminal apparatus B specifies all terminal apparatus in a downstream direction which, connected to the apparatus B itself, receive contents information and form a distribution route, and transmits an own apparatus designated "loop detection packet", including a node identifier (node ID), a sequence number and location information (an IP address and the like) for identifying the apparatus itself, at a certain interval (for example, every ten minutes). In FIG. 6, the terminal apparatus B3 is transmitting a "loop detection packet" to a downstream side distribution route along which the contents information is flowing.

On receiving the "loop detection packet" from upstream, the terminal apparatus B, in the case only that there is a distribution route downstream of the apparatus itself, forwards the "loop detection packet" to the downstream distribution route. At the same time, it stores a reception event of the "loop detection packet" (for example, a node ID, location information, sequence number and reception time of a distribution source) for a certain time (for example, the same ten minutes as the transmission interval of the "loop detection packet") in a loop detection packet registration table managed inside the apparatus itself, as shown in Table 1.

Table 1: Example of Loop Detection Packet Registration

TABLE

| Node ID | Location Information | Sequence Number | Reception Time |
|---|---|---|---|
| Node 1 | 218.227.161.67 | 56 | 2006 Dec. 10 12:00:00 |
| Node 3 | 61.47.100.3 | 55 | 2006 Dec. 10 12:00:32 |
| Node 12 | 220.230.23.39 | 58 | 2006 Dec. 10 12:00:12 |
| Node 32 | 170.38.221.31 | 50 | 2006 Dec. 10 12:00:29 |
| Node 159 | 218.220.67.3 | 32 | 2006 Dec. 10 12:01:00 |

A terminal apparatus B which receives the "loop detection packet" from upstream, in a case in which a downstream terminal apparatus B, which is on a downstream side seen from the apparatus itself, and connected to a control path which is not a distribution route of the active system, is a source of the "loop detection packet", determines that there is a possibility of a loop occurring involving the source and standby system upstream apparatus. In FIG. 6, the terminal apparatus B4, which has received the "loop detection packet" from upstream, recognizes from its node management table that the terminal apparatus which is connected downstream to a control path which is not a distribution route of the active system is the terminal apparatus B3, recognizes from the node ID of the received "loop detection packet" that the source is the terminal apparatus B3 and, as they match, determines that, in the event that the terminal apparatus B3, which is the source, switches to the upstream terminal apparatus B4 of the standby system, a loop will occur in a distribution route from the terminal apparatus B3 to the terminal apparatus B4, and from the terminal apparatus B4 to the terminal apparatus B3.

Then, the terminal apparatus B which has detected the loop in the distribution route with the standby system upstream apparatus transmits a "loop avoidance instruction message" to the source of the "loop detection packet", so as to avoid the loop. In FIG. 6, the terminal apparatus B4 is transmitting the "loop avoidance instruction message" to the terminal apparatus B3, which is the source.

In this way, as the terminal apparatus B3 which is connected downstream to a standby system distribution route which is a control path which is not a distribution route of the active system, and the terminal apparatus B3 which is the source of the "loop detection packet" match, the terminal apparatus B4, which has received the "loop detection packet" from upstream, determines that a loop will occur with the terminal apparatus B3, which is the source, in the distribution route in the standby system. By this means, the terminal apparatus B3 can determine in advance that a loop will occur in the standby system, in the event of switching the upstream apparatus from the active system to the standby system, before actually switching.

Procedure of Switching to Substitute Upstream Apparatus After Loop Detection

Next, a description will be given of a procedure of switching to an upstream terminal apparatus (a substitute upstream apparatus) with which a loop does not occur, after detecting the loop in the distribution route in the standby system. The terminal apparatus B, on receiving the "loop avoidance instruction message", transmits an own apparatus designated "substitute upstream node search packet request message", including a node identifier (node ID), sequence number and location information (an IP address and the like) of the apparatus itself toward the second node of the 0 system or the 1 system (the terminal apparatus B0 or the terminal apparatus B1), making a broadcast request for a transmission of a "substitute upstream node search packet". In FIG. 7, the terminal apparatus B3 is transmitting a broadcast request for a "substitute upstream node search packet" to the terminal apparatus B1, which is the second node (1 in FIG. 7).

The terminal apparatus B0 and B1, which are the second nodes, on receiving a "substitute upstream node search packet request message" (a broadcast request for a "substitute upstream node search packet"), transmit a "substitute upstream node search packet", via control paths of all terminal apparatus B in a downstream direction. The terminal apparatus B, on receiving the "substitute upstream node search packet" from upstream, in the case only that there is a control path downstream of the apparatus itself, forwards the "substitute upstream node search packet" to the downstream control path.

Also, the terminal apparatus B which has received the "substitute upstream node search packet", at the same time, in the event that a node ID the same as that of the source of the received "substitute upstream node search packet" is not registered in a loop detection packet registration table managed inside the apparatus itself, determines that the apparatus itself could become the substitute upstream apparatus of the source. Then, that terminal apparatus B transmits a "substitute upstream node connection permission message" to the source. In FIG. 7, the terminal apparatus B2, determining that the apparatus itself could become the substitute upstream apparatus of the terminal apparatus B3, which is the source, is transmitting the "substitute upstream node connection permission message" to the terminal apparatus B3, which is the source (2 in the same figure).

The terminal apparatus B, on receiving the "substitute upstream node connection permission message", switches a standby system upstream apparatus control path of the apparatus itself to the source of the "substitute upstream node connection permission message". In FIG. 8, the terminal apparatus B3, receiving the "substitute upstream node connection permission message" from the terminal apparatus B2, switches the standby system upstream apparatus control path of the apparatus itself from the terminal apparatus B4 to the terminal apparatus B2, which is the source of the "substitute upstream node connection permission message" (3 in FIG. 8).

By this means, as the terminal apparatus B2 does not exist downstream as seen from the terminal apparatus B3, it does not happen that a loop occurs from the terminal apparatus B3 to the terminal apparatus B2, and from the terminal apparatus B2 to the terminal apparatus B3. Consequently, in the information distribution system S, after determining in advance that a loop (a loop with the terminal apparatus B4) will occur in the standby system in the event that the terminal apparatus B3 switches from the active system to the standby system, the terminal apparatus B3, specifying the terminal apparatus B2 as the substitute upstream apparatus in the standby system, can switch from the terminal apparatus B4, with which a loop occurs, to the terminal apparatus B2, with which no loop occurs, as the upstream apparatus. That is, it is possible to avoid a loop in the distribution route in the standby system.

Terminal Apparatus

Next, a description will be given of a configuration and processes of the terminal apparatus B in the information distribution system S. FIG. 9 is a diagram showing the configuration of the terminal apparatus B. The terminal apparatus B, to which a general personal computer is applicable, is configured including a main power source 202, which supplies power to internal instruments and the like, an auxiliary power source 203, which supplements the main power source 202, a hard disc device 204, which stores various kinds of information and the like, a CPU (Central Processing Unit) 205, which executes predetermined processes in accordance with a program, a network interface 206, for carrying out communication, via the internet, with the information distribution apparatus A and the connection candidate introduction apparatus C, a rewritable main memory 207, which stores various kinds of program and the like, a peripheral equipment control chip 208, which controls an input portion which inputs predetermined information from a user input remote control 222 in accordance with a user's operation, an infrared port 209 for inputting the predetermined information from the user input remote control 222 by means of infrared rays, a video chip 210 which, as well as receiving image information from the CPU 205 and writing it into an internal video memory (not shown), displays the information written into the video memory on a built-in display 211, to be described hereafter, a sound source chip 212, which has an FM (Frequency Modulation) sound source and a Wave Table sound source or the like, and a speaker 213, which converts an audio signal transmitted from the sound source chip 212 into a sound wave. Also, these various kinds of component being mutually connected via a system bus 201, a controller 224 is configured of the CPU 205 and the main memory 207. Also, the network interface 206 is connected to the network via a router 223.

Main Memory

Also, a ring buffer 214, which temporarily stores contents information received from the information distribution apparatus A or from another terminal apparatus B, a stream control program 215 executed in order to, as well as receiving the stream distributed contents information, from the information distribution apparatus A or relayed from another terminal apparatus B, relay the received contents information to another terminal apparatus B connected downstream, in accordance with an unshown node management table, a topology control program 216 which, as well as carrying out a management of location information of upstream and downstream terminal apparatus B, controls the processes of participating in and withdrawing from the mesh type topology, in accordance with the node management table, a loop detection program 217 for detecting a loop in a distribution route and avoiding the loop, an operating system program 218 for providing basic functions of the terminal apparatus B as a computer, a screen control program 219 for controlling the built-in display 211, a decoder program 220 for decoding information on encoded streamed contents, and a loop detection packet registration table 221, which consists of information on a reception event of a "loop detection packet" received from an upstream side (refer to Table 1), are stored in the main memory 207. In the controller 224, the CPU 205 retrieves these programs from the main memory 207, and executes functions according to each program.

Herein, the operating system program 218, by being retrieved and executed by the CPU 205, renders executable the basic functions of the computer, which is the terminal apparatus B. Then, in a condition in which the operating system program 218 is executed by the CPU 205, each program, other than the operating system program 218, stored in the main memory 207 is executed.

It is also acceptable that each program in the main memory 207 is, for example, downloaded from a server, or the like, connected to the internet, and stored, and it is also acceptable that, after being recorded on a storage medium such as a CD-ROM, they are retrieved via a drive of the recording medium, and stored.

Also, in the embodiment of the invention, each program, such as the stream control program 215, the topology control program 216 and the loop detection program 217, is stored individually, but it is also acceptable that these programs are stored in the main memory 207 as one information distribution system program.

Controller

The controller 224, being configured, as heretofore described, of the CPU 205 and main memory 207, centrally controls a whole of the terminal apparatus B by the CPU 205 retrieving and executing the various kinds of program stored in the main memory 207. In particular, in the embodiment of the invention, in order, when the terminal apparatus B switches the upstream apparatus from the active system to the standby system, to avoid a loop occurring in a distribution route of the standby system, the controller 224 functions as a loop detection information transmitter, which transmits a "loop detection packet (loop connection detection information)", a loop detection information receiver, which receives a "loop detection packet", a loop detection information relay, which relays a "loop detection packet", a downstream terminal determiner, which determines whether or not an apparatus is a downstream apparatus, a loop avoidance instruction transmitter, which transmits a "loop avoidance instruction message (loop connection avoidance instruction information)", a loop avoidance instruction receiver, which receives a "loop avoidance instruction message", a loop detection information memory, which stores a "loop detection packet", a search information distribution request transmitter, which transmits a "substitute upstream node search packet distribution request message (a search information distribution request)", a search information distribution request receiver, which receives a "substitute upstream node search packet distribution request message", a search information distributor, which distributes a "substitute upstream node search packet (substitute upstream terminal apparatus search information)", a search information receiver, which receives a "substitute upstream node search packet", a search information relay, which relays a "substitute upstream node search packet", a connection permission transmitter, which transmits a "substitute upstream node connection permission message (substitute upstream terminal apparatus connection permission information)", a connection permission receiver, which receives a "substitute upstream node connection permission message", and a substitute upstream terminal connector, which carries out a connection to a substitute upstream apparatus.

Hereafter, a detailed description will be given of processes of the controller 224 furnished in the terminal apparatus B, using FIGS. 11-1 to 11-4.

Initialization

In step S01, on the terminal apparatus B being started up by the main power source 202, each kind of program stored in the terminal apparatus B is initialized. After the initialization of each kind of program is completed, in step S02, the terminal apparatus B, a participation request from the user via the user input remote control 222 being input, starts a procedure for participating in the mesh type topology which carries out the distribution of contents information, with the participation request as a trigger.

Completion

In step S14, after a process finishing each type of program has been performed, with a turning off of the main power source 202 of the terminal apparatus B as a trigger, the controller 224, in step S15, completes the finishing process by turning off the auxiliary power source 203.

Participation in Topology

With the request to participate in the topology as the trigger, the terminal apparatus B starts the participation procedure. Specifically, in step S13, the controller 224 transmits an "upstream node introduction request message" to the connection candidate introduction apparatus C, and waits for a reception of an upstream apparatus candidate (a response) as a "search result".

In steps S16 to S18, the controller 224, on receiving an upstream apparatus candidate from the connection candidate introduction apparatus C as the "search result", transmits a "connection request message" and a "stream request message" to the upstream apparatus candidate terminal apparatus. By this means, a session is established between the terminal apparatus which is to participate in the topology and the upstream apparatus candidate terminal apparatus. In both the 0 system and the 1 system, these processes are performed for upstream apparatus.

Then, in step S19, the controller 224 transmits a "stream start request message" to an upstream apparatus, among the upstream apparatus of the 0 system and the 1 system, on a lower hierarchical level. Supplying contents information from the upstream apparatus on the lower hierarchical level is done because it is advantageous from a point of minimizing a delay in transmitting contents information from the information distribution apparatus A, and a deterioration in a stream quality. Then, in step S20, the controller 224 transmits a "topology participation report" to the connection candidate introduction apparatus C. By this means, the terminal apparatus B which requests the participation can participate in the topology.

Relay and Playback of Contents Information

In the event of receiving a packet of contents information (a contents packet) from an upstream apparatus (step S21: Yes), the controller 224 investigates, in step S22, by means of a node management table, whether or not a downstream terminal apparatus exists immediately below its own apparatus. If a downstream apparatus exists, the controller 224, in step S23, relays the received contents packet, and shifts to step S24. If no downstream node exists, the controller 224 does not relay the received contents packet. Then, in step S24, the controller 224 decodes the contents packet by means of the decoder program 220, and plays back the decoded contents data via the video chip 210 and the sound source chip 212.

Withdrawal from Topology

If a withdrawal request from the user via the user input remote control 222 is input (step S25: Yes), the terminal apparatus B starts a procedure for withdrawing from the mesh type topology which carries out the distribution of contents information, with the withdrawal request as a trigger. In steps S26 to S28, the controller 224 transmits a "stream stop request message" and a "connection break request message" to upstream apparatus of the active system, and a "connection break request message" to upstream apparatus of the standby system. Then, in step S29, the controller 224 transmits a "topology withdrawal report" to the connection candidate introduction apparatus C. By this means, the terminal apparatus B which requests a withdrawal can withdraw from the topology.

Participation and Withdrawal of Downstream Terminal Apparatus

In steps S30 to S33, the controller 224, with a participation in/withdrawal from the topology of a downstream apparatus as a trigger, determines whether or not it has received a "connection request message"/"connection break request message" from the downstream apparatus. Then, in steps S31 and S33, the controller 224, after receiving each message, performs a registration in/deletion from the node management table of information relating to the downstream apparatus, for the purpose of updating connection information of the downstream apparatus.

Starting and Finishing of Streaming

In steps S34 to S37, the controller 224, on receiving a "stream start request message"/"stream stop request message" from a downstream apparatus, performs a starting or stopping of a streaming to the downstream apparatus.

Switching of Upstream Terminal Apparatus

In steps S38 to S40, in the event that some kind of problem has occurred, and contents information has ceased to be supplied from an upstream apparatus of the active system, the controller 224 transmits a "stream stop request message" to the upstream apparatus of the active system, after which, it transmits a "stream start request message" to an upstream apparatus of the standby system. By this means, a switching of the upstream apparatus from the active system to the standby system is completed.

Loop Detection for Standby System Upstream Apparatus

The terminal apparatus B, maintaining the predetermined time interval, regularly (for example, at ten minute intervals) repeats an investigation of whether or not a loop exists in a distribution route involving standby system upstream apparatus. In steps S41 to S43, the controller 224, with a distribution route loop monitoring as a trigger, investigates, by means of the node management table, whether or not a downstream apparatus exists immediately below its own apparatus, and transmits a "loop detection packet (loop connection detection information)", including identification information (a node identifier, location information and the like of its own apparatus) for identifying its own apparatus, from the apparatus equipped with the controller 224 to the downstream apparatus receiving the contents information. The controller 224 which executes these kinds of step functions as the loop detection information transmitter.

In step S44, the controller 224 determines whether or not it has received a "loop detection packet (loop connection detection information)". The controller 224 which executes this kind of step functions as the loop detection information receiver. Then, if it receives a "loop detection packet (loop connection detection information)" (step S44: Yes), in step S45, the controller 224, based on identification information in the "loop detection packet", determines, with the node management table, whether or not the source is already connected as a downstream apparatus of its own apparatus. The controller 224 which executes this kind of step functions as the downstream terminal determiner. Then, if it determines that there is already a connection (if the source of the "loop detection packet" is a downstream apparatus of its own apparatus), the controller 224 determines, in step S46, that a loop will occur in a distribution route between its own apparatus and the source of the "loop detection packet", and transmits a "loop avoidance instruction message (loop connection avoidance instruction information)" to the distribution source. The controller 224 which executes this kind of step functions as the loop avoidance instruction transmitter. If there is not already a connection (if the source of the "loop detection packet" is not a downstream apparatus of its own apparatus), the controller 224 skips the transmission process of step S46.

Then, in step S47, the controller 224 records a reception event (for example, a node ID, location information, and sequence number of the distribution source, and a reception time) of the "loop detection packet (loop connection detection information)" in the loop detection packet registration table 221. In this case, the controller 224 deletes the recording when a certain time (for example, a time which is the same as the time interval at which the "loop detection packet" is transmitted and the existence of a loop is investigated) has elapsed. The controller 224 which executes this kind of step functions as the loop detection information memory.

Then, in steps S48 and S49, the controller 224 investigates, by means of the node management table, whether or not a downstream apparatus exists immediately below its own apparatus and, if one exists, relays the "loop detection packet (loop connection detection information)" to the downstream apparatus. If one does not exist, the controller 224 does not carry out the relay. The controller 224 which executes this kind of step functions as the loop detection information relay.

Meanwhile, in step S50, the controller 224 receives the "loop avoidance instruction message (loop connection avoidance instruction information)". The controller 224 which executes this kind of step functions as the loop avoidance instruction receiver. Then, in step S51, the controller 224 transmits a "substitute upstream node search packet distribution request message (a search information distribution request)", including identification information (a node identifier, location information and the like of its own apparatus) for identifying its own apparatus, to the second node of the 0 system or the 1 system (the terminal apparatus B0 or the terminal apparatus B1), so as to request a transmission of a "substitute upstream node search packet (substitute upstream terminal apparatus search information)". The controller 224 which executes this kind of step functions as the search information distribution request transmitter.

Switching to Substitute Upstream Terminal Apparatus After Loop Detection

In step S52, the controller 224 determines whether or not it has received the "substitute upstream node search packet distribution request message (the search information distribution request)", including the identification information (regarding upstream apparatus of the standby system, identification information of a terminal apparatus where a distribution route loop exists). The controller 224 which executes this kind of step functions as the search information distribution request receiver. Then, if it has received the substitute upstream node search packet distribution request message (step S52: Yes), the controller 224, in steps S53 and S54, with the substitute upstream node search packet distribution request as a trigger, investigates, by means of the node management table, whether or not a downstream apparatus exists immediately below its own apparatus, and distributes a "substitute upstream node search packet (substitute upstream terminal apparatus search information)", including the identification information, toward the downstream apparatus of its own apparatus. The controller 224 which executes this kind of step functions as the search information distributor.

Meanwhile, in step S55, the controller 224 determines whether or not it has received the "substitute upstream node search packet (the substitute upstream terminal apparatus search information)", including the identification information. The controller 224 which executes this kind of step functions as the search information receiver. Then, if it has received the substitute upstream node search packet (step S55: Yes), the controller 224, in steps S56 and S57, determines whether or not there exists, in the loop detection packet registration table 221 of its own apparatus, a recording of a reception event of a "loop detection packet" which the source matches and, if one does not exist, transmits a "substitute upstream node connection permission message (substitute upstream terminal apparatus connection permission information)" to the source of the "substitute upstream node search packet" (the terminal apparatus indicated by the identification information included in the "substitute upstream node search packet"), informing it that it is possible to connect as a substitute terminal apparatus for avoiding a loop with respect to an upstream apparatus in the standby system. The controller 224 which executes this kind of step functions as the connection permission transmitter.

Then, in steps S58 and S59, the controller 224 investigates, by means of the node management table, whether or not a downstream apparatus exists immediately below its own apparatus, and relays the "substitute upstream node search packet (the substitute upstream terminal apparatus search information)", including the identification information, toward the downstream apparatus of its own apparatus. The controller 224 which executes this kind of step functions as the search information relay.

Meanwhile, in step S60, the controller 224 determines whether or not it has received the "substitute upstream node connection permission message (the substitute upstream terminal apparatus connection permission information)". The controller 224 which executes this kind of step functions as the connection permission receiver. Then, if it has received the substitute upstream node connection permission message (step S60: Yes), the controller 224 (the controller 224 of the terminal apparatus where the distribution route loop exists with respect to the standby system upstream apparatus), in step S61, switches a current standby system connection to the source of the "substitute upstream node connection permission message (the substitute upstream terminal apparatus connection permission information)". The controller 224 which executes this kind of step functions as the substitute upstream terminal connector. By this means, it is possible to preemptively avoid an occurrence of a distribution route loop in the standby system.

Connection Candidate Introduction Apparatus

Next, a description will be given of a configuration and processes of the connection candidate introduction apparatus C in the information distribution system S. FIG. 10 is a diagram showing the configuration of the connection candidate introduction apparatus C. The connection candidate introduction apparatus C, to which a general server computer is applicable, is configured including a CPU 402, which executes predetermined processes in accordance with a program, a hard disc device 403 configured of a topology database 411, in which is stored topology management information relating to the terminal apparatus B, such as node numbers, IP addresses and connection information, as well as of a terminal management database 412, in which is stored location information and the like of the information distribution apparatus A and the terminal apparatus B, and the like, a network interface 404, which carries out communication, via the internet, with the terminal apparatus B, a rewritable main memory 405, which stores various kinds of program and the like, a peripheral equipment control chip 406, which controls an input portion of a keyboard 407 and a mouse 408 which can input predetermined information, and a video chip 409 which, as well as receiving image information from the CPU 402 and writing it into an internal video memory (not shown), displays the information written into the video memory on a display 410, to be described hereafter. Also, these various kinds of component being mutually connected via a system bus 401, a controller 419 is configured of the CPU 402 and the main memory 405.

Main Memory

Also, a terminal management program 413 for managing the location information of the plurality of terminal apparatus B (the IP addresses and port numbers), a topology management program 414 for constructing and managing the mesh type topology according to the plurality of terminal apparatus B, an operational management program 415, which carries out operational management of an overall process in the connection candidate introduction apparatus C, an OS program 416 for providing basic functions of the connection candidate introduction apparatus C as a computer, and a connection destination introduction program 417 for selecting an upstream node candidate corresponding to an "upstream node introduction request" transmitted from a terminal apparatus B, and transmitting it to the terminal apparatus B as a search result, are stored in the main memory 405. In the controller 419, the CPU 402 retrieves these programs from the main memory 405, and executes functions according to each program.

Herein, the operating system program 416, by being retrieved and executed by the CPU 402, renders executable the basic functions of the computer, which is the connection candidate introduction apparatus C. Then, in a condition in which the operating system program 416 is executed by the CPU 402, each program, other than the operating system program 416, stored in the main memory 405 is executed.

It is also acceptable that each program in the main memory 405 is, for example, downloaded from a server, or the like, connected to the internet, and stored, and it is also acceptable that, after being recorded on a storage medium such as a CD-ROM, they are retrieved via a drive of the storage medium, and stored.

Initialization

In step S101, on the connection candidate introduction apparatus C starting up, each kind of program stored in the connection candidate introduction apparatus C is initialized. After the initialization of each kind of program is completed, the connection candidate introduction apparatus C attains a condition in which it can receive request messages from the information distribution apparatus A and the terminal apparatus B.

Registration and Deletion of Information Distribution Apparatus

In steps S102 to S104, the controller 419, if it receives a "registration request" from the information distribution apparatus A by means of the terminal management program 413, registers the location information of the information distribution apparatus A in the terminal management database 412, and registers information on a new channel in the topology database 411. On the other hand, if, in steps S102 to S104, the controller 419 receives a "registration deletion request" from the information distribution apparatus A by means of the terminal management program 413, it deletes the location information of the information distribution apparatus A from the terminal management database 412, and deletes the relevant channel information from the topology database 411.

Introduction of Upstream Apparatus Candidate

In steps S106 to S108, the controller 419, if it receives an "upstream node introduction request message" from a terminal apparatus B by means of the connection destination introduction program 417, searches the topology database 411 for candidates of terminal apparatus B which can be connected on a downstream side, and transmits two upstream apparatus candidates to the terminal apparatus B which is the request source as a "search result".

Topology Information Update

In steps S109 and S110, the controller 419, if it receives a "topology participation report"/"topology withdrawal report" from a terminal apparatus B by means of the topology management program 414, determines that there has been a fluctuation in the topology, and updates the topology database 411.

Heretofore, a description has been given of the configuration and processes of the terminal apparatus B and the connection candidate introduction apparatus C but, with respect to the information distribution apparatus A, as no configuration or process indicating features of the invention is included, a description will be omitted here.

As heretofore described, according to the embodiment of the invention, in the information distribution system S, a terminal apparatus B which has received a "loop detection packet" from upstream determines whether or not a terminal apparatus connected downstream in the standby system which is a control path which is not a distribution route of the active system, and the source of the "loop detection packet" match and, in the event that they match, determines that a loop will occur in the standby system. By this means, it is possible to determine in advance that a loop will occur involving the standby system upstream apparatus, before actually switching from the active system to the standby system. That is, as the loop detection in the standby system is determined depending on whether or not the identification number of the terminal apparatus connected in the standby system, and the identification number of the source of the "loop detection packet", match, the detection is possible by means of a simple method. Also, in Japanese Unexamined Patent Publication No. 2000-49779 indicated in background technology, as packets for detecting loops are transmitted in an upstream direction, there is a tendency for the packets to concentrate in a specific terminal apparatus. In response to this, in the embodiment of the invention, as the "loop detection packets" are transmitted in a downstream direction, it being unlikely, unlike Japanese Unexamined Patent Publication No. 2000-49779, that the packets concentrate in a specific terminal apparatus, it is possible to reduce a processing load.

Also, according to the embodiment of the invention, after determining in advance that a loop will occur in the standby system in the event of switching from the active system to the standby system, a "substitute upstream node search packet" is transmitted in a downstream direction from the terminal apparatus B0 and B1, which are the second nodes, and a terminal apparatus which is a terminal apparatus which has received the "substitute upstream node search packet", but has not received a "loop detection packet", is made a substitute upstream apparatus. By this means, it being possible to switch to the substitute upstream apparatus, with which no loop occurs, in place of a terminal apparatus with which a loop occurs, as the upstream terminal apparatus in the standby system, it is possible to avoid a loop in the standby system. That is, the avoidance of the loop is possible by means of a simple method.

In this way, in the embodiment of the invention, the loop detection involving the upstream apparatus in the standby system, and the specification of a substitute upstream apparatus with which a loop does not occur, are carried out before actually switching from the active system to the standby system. To date, a loop has only been noticed after switching from the active system to the standby system but, as it is possible to avoid a loop condition in advance, it is possible to increase reliability as the information distribution system S. Also, in the embodiment, an example is shown of a case of switching the upstream apparatus from the active system to the standby system, but it is also possible to apply the invention in the same way in a case of switching the upstream apparatus from the standby system to the active system.

Modification Examples

Hereafter, a description will be given of modification examples of the embodiment of the invention. In the embodiment, it is arranged in such a way that the terminal apparatus B, maintaining the predetermined time interval, regularly transmits a "loop detection packet" downstream along the distribution routes, and repeats an investigation into whether or not a distribution route loop will occur in the standby system, but it is also acceptable to arrange in such a way that a timing of transmitting the "loop detection packet", and repeating the investigation into the occurrence of the loop, is carried out at random. In this case, the loop detection information transmitter in the controller of the terminal apparatus B functions in such a way as to transmit the "loop detection packet" at randomly set time intervals. For example, in the embodiment, in a case of making two a maximum number connected on the downstream side of the terminal apparatus B, even when one million terminal apparatus B participate in the information distribution system S, as at most 20 nodes exist in a route path (a path from the terminal apparatus to the information distribution apparatus A, which is a contents source), a probability of a concentration of traffic occurring is basically low but, in the event of the heretofore described modification example being added, it is possible to further reduce the probability of the concentration occurring.

Also, in the embodiment, it is arranged in such a way that the terminal apparatus B relays the "loop detection packet" as far as a farthest downstream terminal apparatus (a leaf node) which forms the mesh type topology, but it is also acceptable to provide an area in the "loop detection packet" in which to record a relay count, increase the relay count after every relay, relay the packet in the event that a preset threshold has not been reached, and stop the relay of the packet in the event the preset threshold has been reached or exceeded. Generally, a loop existing in a distribution route having a size, a loop with a small number of loop route relay stages (a small loop) occurs in a case in which there is a small hierarchical gap in upstream terminal apparatus between the active system and the standby system in each terminal apparatus B. A loop with a large number of loop route relay stages (a large loop) occurs in a case in which there is a large hierarchical gap in upstream terminal apparatus between the active system and the standby system in each terminal apparatus B. Therein, in the case of switching from the upstream apparatus of the active system to the upstream apparatus of the standby system in the terminal apparatus B, normally, by controlling in such a way as to contain the hierarchical gap in the upstream apparatus between the active system and the standby system at or below a certain standard, as it is only possible for a small loop to occur, it is not necessary for the terminal apparatus B to forward the "loop detection packet" as far as the farthest downstream terminal apparatus. According to the heretofore described modification example, as a "loop detection packet" relay process count in the terminal apparatus B is limited, it being possible to reduce a total of "loop detection packets" which the terminal apparatus B has to relay, it is possible to reduce the processing load.

Also, in the embodiment, it is arranged in such a way that the terminal apparatus B0 and B1, which are the second nodes, transmit a "substitute upstream node search packet" in a downstream direction, and search for a substitute upstream apparatus. In this case, it is conceivable that a large number of terminal apparatus are suited to be substitute upstream apparatus. This being so, a "substitute upstream node connection permission message" being returned to the source from the suitable substitute upstream apparatus, a concentration of packets occurs. In response to this, in the modification example, the terminal apparatus B0 and B1, which are the second nodes, attach a connection condition (for example, a condition of connecting only in the event that AS (Autonomous System) numbers and/or ISP names match) to the "substitute upstream node search packet", the terminal apparatus B receives the "substitute upstream node search packet" and, at a time of a substitute upstream apparatus suitability process, in the event that it meets the connection condition, returns a "substitute upstream node connection permission message". In this case, the connection permission transmitter in the controller of the terminal apparatus B functions in the way heretofore described. By this means, it being possible to avoid the concentration of the packets, it is possible to reduce the processing load.

Also, the invention is not limited to the heretofore described embodiment. The embodiment being an illustration, an article having a configuration essentially identical to a technological idea described in the claims of the invention is included, in whatever case, in the technological scope of the invention.

Also, the entire contents of Japanese patent Application No. 2007-121199, including specifications, claims, drawings and abstract, filed on May 1, 2007 are incorporated herein by reference.

Although the embodiment and modifications of the present invention have been described in detail herein, the scope of the invention is not limited thereto. It will be appreciated by those skilled in the art that various modifications may be made without departing from the scope of the invention. Accordingly, the embodiment and modifications disclosed herein are only exemplary. It is to be understood that the scope of the invention is not to be limited thereby, but is to be determined by the claims which follow.

What is claimed is:

1. A terminal apparatus in an information distribution system which includes:
    an information distribution apparatus which distributes contents information via a network; and
    a plurality of the terminal apparatus which, being connected to the network, receive the contents information distributed from the information distribution apparatus, and in which
    a plurality of hierarchical structures, formed by the plurality of terminal apparatus being logically connected in multiple layers with the information distribution apparatus as an apex, are provided on the network, and the terminal apparatus, in a condition in which the terminal apparatus participates in a first hierarchical structure and a second hierarchical structure which constitutes at least two of the hierarchical structures, receives the contents information from an upstream terminal apparatus connected to the terminal apparatus in the first hierarchical structure or the second hierarchical structure, the terminal apparatus comprising:
    a loop detection information transmitter which transmits loop connection detection information including identification information for identifying the terminal apparatus, to a downstream terminal apparatus which is connected to the terminal apparatus receiving the contents information from the terminal apparatus;
    a loop detection information receiver which receives the loop connection detection information;
    a loop detection information relay which relays the received loop connection detection information to the downstream terminal apparatus connected to the terminal apparatus receiving the contents information from the terminal apparatus;
    a downstream terminal determiner which determines whether or not a terminal apparatus corresponding to the received loop connection detection information is a downstream terminal apparatus connected to the terminal apparatus in the plurality of hierarchical structures;
    a loop avoidance instruction transmitter which, in the event that it is determined, by the downstream terminal determiner, that the terminal apparatus corresponding to the received loop connection detection information is the downstream terminal apparatus connected to the terminal apparatus, transmits loop connection avoidance instruction information, which instructs an avoidance of a loop connection, to the terminal apparatus corresponding to the loop connection detection information;
    a loop avoidance instruction receiver which receives the loop connection avoidance instruction information; and
    a controller that avoids a loop connection occurring in a distribution route of the contents information by not setting an upstream terminal apparatus to a terminal apparatus which has transmitted the loop connection avoidance instruction information, when the terminal apparatus switches the upstream terminal apparatus connected to the terminal apparatus in the first hierarchical structure to the upstream apparatus connected to the terminal apparatus in the second hierarchical structure.

2. The terminal apparatus according to claim 1, wherein the controller further includes:
    a loop detection information memory which stores the received loop connection detection information for a predetermined time;
    a search information distribution request transmitter which, with the reception of the loop connection avoidance instruction information by means of the loop avoidance instruction receiver as a trigger, transmits a search information distribution request, including identification information for identifying its own apparatus, requesting a distribution of substitute upstream terminal apparatus search information to a terminal apparatus connected to the information distribution apparatus in a predetermined one of the hierarchical structures;
    a search information distribution request receiver which receives the search information distribution request;
    a search information distributor which, with the reception of the search information distribution request as a trigger, distributes the substitute upstream terminal apparatus search information to a downstream terminal apparatus connected to its own apparatus;
    a search information receiver which receives the substitute upstream terminal apparatus search information;
    a search information relay which relays the received substitute upstream terminal apparatus search information to a downstream terminal apparatus connected to its own apparatus in the predetermined hierarchical structure;
    a connection permission transmitter which, in the event that the loop connection detection information relating to a terminal apparatus corresponding to the received substitute upstream terminal apparatus search information is not stored in the loop detection information memory, transmits substitute upstream terminal apparatus connection permission information, permitting a connection to a downstream side of its own apparatus, to a terminal apparatus corresponding to the substitute upstream terminal apparatus search information;

a connection permission receiver which receives the substitute upstream terminal apparatus connection permission information; and a substitute upstream terminal connector which connects the terminal apparatus which has transmitted the substitute upstream terminal apparatus connection permission information.

3. The terminal apparatus according to claim 1, wherein the loop detection information transmitter, maintaining a time interval, repeatedly transmits the loop connection detection information.

4. The terminal apparatus according to claim 3, wherein the loop detection information transmitter randomly sets the time interval at which it transmits the loop connection detection information.

5. The terminal apparatus according to claim 1, wherein the loop connection detection information including a relay count recording area in which to record the count of relays by the loop detection information relay, the loop detection information relay, in the event that a relay count recorded in the relay count recording area is smaller than a predetermined threshold, relays the loop connection detection information.

6. The terminal apparatus according to claim 2, wherein the substitute upstream terminal apparatus search information including a predetermined condition recording area, in which is recorded a predetermined condition relating to the terminal apparatus, the connection permission transmitter, in the event that its own apparatus meets the predetermined condition included in the substitute upstream terminal apparatus search information, transmits the substitute upstream terminal apparatus connection permission information.

7. A terminal apparatus according to claim 1, wherein the controller, when the terminal apparatus switches the upstream terminal apparatus which receives the contents information from the upstream terminal apparatus connected to the terminal apparatus in the first hierarchical structure to the upstream terminal apparatus connected to the terminal apparatus in the second hierarchical structure, by switching an upstream terminal apparatus from the terminal apparatus which has transmitted the loop connection avoidance instruction information to another terminal apparatus which differs from the terminal apparatus which has transmitted the loop connection avoidance instruction information, avoids the loop connection occurring in the distribution route of the contents information.

8. A non-transitory recording medium, on which a program for causing a computer to function as each component of the terminal apparatus according to claim 1 is recorded so as to be readable by the computer.

9. An information distribution system comprising:

an information distribution apparatus which distributes contents information via a network; and a plurality of terminal apparatus which, being connected to the network, receive the contents information distributed from the information distribution apparatus, wherein a plurality of hierarchical structures, formed by the plurality of terminal apparatus being logically connected in multiple layers with the information distribution apparatus as an apex, are provided on the network, and the terminal apparatus, in a condition in which the terminal apparatus participates in a first hierarchical structure and a second hierarchical structure which constitutes at least two of the hierarchical structures, receives the contents information from an upstream terminal apparatus connected to the terminal apparatus in the first hierarchical structure or the second hierarchical structure, the terminal apparatus including:

a loop detection information transmitter which maintains a time interval, and repeatedly transmits loop connection detection information, including identification information for identifying the terminal apparatus, to a downstream terminal apparatus which is connected to the terminal apparatus receiving the contents information from the terminal apparatus;

a loop detection information receiver which receives the loop connection detection information;

a loop detection information relay which relays the received loop connection detection information to the downstream terminal apparatus, connected to the terminal apparatus receiving the contents information from the terminal apparatus;

a downstream terminal determiner which determines whether or not a terminal apparatus corresponding to the received loop connection detection information is a downstream terminal apparatus connected to the terminal apparatus in the plurality of hierarchical structures;

a loop avoidance instruction transmitter which, in the event that it is determined, by means of the downstream terminal determiner, that the terminal apparatus corresponding to the received loop connection detection information is the downstream terminal apparatus connected to the terminal apparatus, transmits loop connection avoidance instruction information, which instructs an avoidance of a loop connection, to the terminal apparatus corresponding to the loop connection detection information;

a loop avoidance instruction receiver which receives the loop connection avoidance instruction information; and a controller that avoids a loop connection occurring in a distribution route of the contents information by not setting an upstream terminal apparatus to a terminal apparatus which has transmitted the loop connection avoidance instruction information when the terminal apparatus switches the upstream terminal apparatus connected to the terminal apparatus in the first hierarchical structure to the upstream apparatus connected to the terminal apparatus in the second hierarchical structure.

10. A loop connection avoidance method which, in an information distribution system which includes:

an information distribution apparatus which distributes contents information via a network; and a plurality of terminal apparatus which, being connected to the network, receive the contents information distributed from the information distribution apparatus, and in which a plurality of hierarchical structures, formed by the plurality of terminal apparatus being logically connected in multiple layers with the information distribution apparatus as an apex, are provided on the network, and the terminal apparatus, in a condition in which it participates in a first hierarchical structure and a second hierarchical structure which constitutes at least two of the hierarchical structures, receives the contents information from an upstream terminal apparatus connected to the terminal apparatus in the first hierarchical structure or the second hierarchical structure, avoids a loop connection occurring in a distribution route of the contents information when the terminal apparatus switches the upstream terminal apparatus, connected to the apparatus itself in the one hierarchical structure and provides the contents information, to another upstream terminal apparatus, connected to the apparatus itself in another hierarchical structure, the method comprising:

a step of the terminal apparatus, maintaining a time interval, repeatedly transmitting loop connection detection information, including identification information for identifying the terminal apparatus, to a downstream terminal apparatus which is connected to the terminal apparatus receiving the contents information from the terminal apparatus;

a step of the terminal apparatus receiving the loop connection detection information;

a step of the terminal apparatus relaying the received loop connection detection information to the downstream terminal apparatus, connected to the terminal apparatus receiving the contents information from the terminal apparatus;

a step of determining whether or not a terminal apparatus corresponding to the received loop connection detection information is a downstream terminal apparatus connected to the terminal apparatus in the plurality of hierarchical structures;

a step of the terminal apparatus, in the event that it is determined that the terminal apparatus corresponding to the received loop connection detection information is a downstream terminal apparatus connected to the terminal apparatus, transmitting loop connection avoidance instruction information, which instructs an avoidance of a loop connection, to the terminal apparatus corresponding to the loop connection detection information;

a step of receiving the loop connection avoidance instruction information; and a step of, avoiding a loop connection occurring in a distribution route of the contents information by not setting an upstream terminal apparatus to a terminal apparatus which has transmitted the loop connection avoidance instruction information when the terminal apparatus switches the upstream terminal apparatus connected to the terminal apparatus in the first hierarchical structure to the upstream apparatus connected to the terminal apparatus in the second hierarchical structure.

* * * * *